(12) United States Patent
Chow et al.

(10) Patent No.: US 10,509,798 B2
(45) Date of Patent: Dec. 17, 2019

(54) DATA FLOW DESIGN WITH STATIC AND DYNAMIC ELEMENTS

(71) Applicant: Informatica LLC, Redwood City, CA (US)

(72) Inventors: Jedidiah J D Chow, Livermore, CA (US); Kathleen L. Gannon, Santa Clara, CA (US); Itai Kranz, Palo Alto, CA (US); Arun Patnaik, Union City, CA (US); Amit Sethiya, Sunnyvale, CA (US); Lalitha Sundaramurthy, Saratoga, CA (US)

(73) Assignee: Informatica LLC, Redwood City, CA (US)

( * ) Notice: Subject to any disclaimer, the term of this patent is extended or adjusted under 35 U.S.C. 154(b) by 368 days.

(21) Appl. No.: 15/152,502

(22) Filed: May 11, 2016

(65) Prior Publication Data

US 2017/0329786 A1   Nov. 16, 2017

(51) Int. Cl.
| | | |
|---|---|---|
| *G06F 16/00* | (2019.01) | |
| *G06F 16/25* | (2019.01) | |
| *G06F 16/21* | (2019.01) | |
| *G06F 16/9535* | (2019.01) | |
| *G06F 3/0481* | (2013.01) | |
| *G06F 3/0486* | (2013.01) | |
| *G06F 8/34* | (2018.01) | |

(52) U.S. Cl.
CPC .......... *G06F 16/252* (2019.01); *G06F 3/0486* (2013.01); *G06F 3/04817* (2013.01); *G06F 8/34* (2013.01); *G06F 16/212* (2019.01); *G06F 16/25* (2019.01); *G06F 16/9535* (2019.01)

(58) Field of Classification Search
None
See application file for complete search history.

(56) References Cited

U.S. PATENT DOCUMENTS

| | | | | |
|---|---|---|---|---|
| 2008/0059749 | A1* | 3/2008 | Kathuria | ........... G06F 17/30339 711/170 |
| 2013/0282768 | A1* | 10/2013 | Tkac | ................. G06F 17/30569 707/804 |

FOREIGN PATENT DOCUMENTS

| | | | | |
|---|---|---|---|---|
| WO | WO 0250691 A1 * | 6/2002 | ......... | G06F 17/2241 |

OTHER PUBLICATIONS

Informatica, "Developer Mapping Guide," Version 10.0, Nov. 2015, 1993-2015 Informatica LLC, pp. 1-174, [retrieved on Jun. 25, 2017]. Retrived from the Internet: <URL: https://kb.informatica.com/proddocs/Product%20Documentation/4/IN_100_InformaticaMappingGuide_en.pdf>.*

* cited by examiner

*Primary Examiner* — Bai D Vu
(74) *Attorney, Agent, or Firm* — Amardeep S. Grewal; Reed Smith LLP

(57) ABSTRACT

A data flow design system is presented that includes support for both static elements and dynamic elements. Thus, the data flow design system provides a design environment graphical tool to users to design data flows that leverage both the repeatability of static elements and the adaptability of dynamic elements. Static elements process data that typically do not change over time, while dynamic elements process data that do change. For instance, new data fields are added to an input data source of a data flow. The dynamic elements automatically link the new data fields to mapping fragments of the data flow. Mapping fragments process data based on configuration parameters including expression and filter rules. Users use a user interface of the design environment to view and add mapping fragments, static links, and dynamic links to the data flow.

21 Claims, 18 Drawing Sheets

```xml
<mapping:Mapping name="Mapplet1" imx:id="U:6XSWYxIOEeaYXx6bO3F3PA">
  <characteristics>
    <Characteristic imx:id="ID_1" xsi:type="mapplet:MappletCharacteristic">
      <interfaceCardinalities>
        <MappletInterfaceCardinality imx:id="ID_2" xsi:type="mapplet:MappletInterfaceCardinality"
          dataInterfaces="U:7PeiwBIOEeaYXx6bO3F3PA U:eicfWxMjEeanjfvChsEyjw"/>
      </interfaceCardinalities>
    </Characteristic>
    <Characteristic imx:id="ID_3" xsi:type="runtime:RuntimeCharacteristic" selectedExecutionEnvironmentName="native">
      <environments>
        <ExecutionEnvironment imx:id="ID_4" xsi:type="runtime:NativeExecutionEnvironment"/>
      </environments>
    </Characteristic>
  </characteristics>
  <instances>
    <Instance transformation="U:7PeivxIOEeaYXx6bO3F3PA" name="input" imx:id="U:7PeivhIOEeaYXx6bO3F3PA" xsi:type="mapping:Instance">
      <fromOutlineLinks>
        <OutlineLink imx:id="ID_5" xsi:type="mapping:OutlineLink" toInstance="U:eiCfSRMjEeanjfvChsEyjw"
          fromInstance="U:7PeivhIOEeaYXx6bO3F3PA"/>
      </fromOutlineLinks>
      <ports>
        <TransformationFieldPort imx:id="ID_6" xsi:type="mapping:TransformationFieldPort"
          transformationField="U:7PeiwRIOEeaYXx6bO3F3PA" instance="U:7PeivhIOEeaYXx6bO3F3PA" toPorts="ID_7"/>
        <TransformationFieldPort imx:id="ID_8" xsi:type="mapping:TransformationFieldPort"
          transformationField="U:7PeivhIOEeaYXx6bO3F3PA" instance="U:7PeivhIOEeaYXx6bO3F3PA" toPorts="ID_9"/>
        <TransformationFieldPort imx:id="ID_10" xsi:type="mapping:TransformationFieldPort"
          transformationField="U:7PeivxIOEeaYXx6bO3F3PA" instance="U:7PeivhIOEeaYXx6bO3F3PA" toPorts="ID_11"/>
      </ports>
    </Instance>
  </instances>
```

DATA FLOW DESIGN WITH STATIC AND DYNAMIC ELEMENTS

FIELD OF DISCLOSURE

This disclosure relates generally to implementations of database and/or database management system, including data modeling, schema, conceptual layout and physical layout, and more particularly to graphical user interfaces for generating or modifying the data flow design in database, schema, or database structure with static and dynamic elements.

Field of Classification: 707/790, 707/802, 707/803, 707/805.

BACKGROUND

Enterprises collect large volumes of digital data and often want to integrate data from various sources and analyze the data. Digital data may be stored in databases, spreadsheets, text documents, online websites, or other forms of electronic records. Integrating data from these sources typically requires processing the data into a standardized format. Each enterprise may have a preferred standardized format that requires customization for their particular use. Data flow design systems provide enterprises tools to design custom data flows for integrating and analyzing their data. For example, a business uses data flows to process raw sales data and generate sales reports to drive business operation decisions.

Existing data flow design systems may not be flexible to changes in data flows over time. Input data sources often change due to various factors, e.g., an enterprise uses new data collection or database management software or the enterprise wants to analyze new types of data. Users of existing design systems need to manually update previously designed data flows to accommodate these changes, which can be time consuming, tedious, and prone to errors.

SUMMARY

Data integration in a database management system provides users valuable insight by unifying data from a variety of sources. For example, businesses use data integration to combine information across databases and determine analytics that drive business decisions. A data flow design system in the database management system includes graphical user interface tools for both creating and modifying data flows with multiple mapping fragments, and enables the data transformations underlying the mapping fragments. The data flows retrieve data from multiple online databases and unify the retrieved data by performing customized procedures created by the user.

A user designs data flows using the graphical user interface tools. A data flow processes data, for example, determining the sum of a row of numbers in a spreadsheet. The graphical user interface tool includes a display area that shows data flows and icons that the user selects to add mapping fragments to a data flow. The parts include different types of mapping fragments, or portions of the mapping, and links that connect the fragments together. The user may drag and drop a section of one fragment to another fragment to create a link between the two fragments. The user may also customize the fragments using different rules. The user executes the data flow, which processes input data to create output data, for example, to process sales order records into a master sales order database.

The data flow design system provides a design environment to users to design data flows that have mapping fragments (i.e., the portions of a mapping), static elements, and dynamic elements (i.e., static and dynamic "ports"). Mapping fragments are reusable objects including transformations that are applied to input data of the data flow. Static elements process data that typically do not change over time, while dynamic elements process data that do change. For instance, new data fields are added to a source online database of a data flow. The dynamic elements automatically link the new data fields to mapping fragments of the data flow. Additionally, mapping fragments include static ports and dynamic ports. A static port corresponds to one data field, while a dynamic port corresponds to zero or more data fields. A static link maps a static port of an upstream mapping fragment to an input port of a downstream mapping fragment. A dynamic link maps a data field group or a dynamic port of an upstream mapping fragment to an input port of a downstream mapping fragment such that all data fields of the upstream mapping fragment's data field group or dynamic port flow to the input port of the downstream mapping fragment, optionally subject to inclusion and exclusion rules.

According to one embodiment, a method begins with receiving, in a data integration development environment, a definition of a data flow modeling a data mapping. The definition includes mapping fragments and dynamic and static links between the mapping fragments, as well as configuration parameters, as follows. First, a plurality of mapping fragments are received for inclusion in the data flow, wherein each mapping fragment comprises a plurality of ports, the plurality of ports including at least one dynamic port or one static port, a dynamic port corresponding to zero or more ports of the plurality of ports, a static port corresponding to one port of the plurality of ports, each port corresponding to at least one data field. Next input is received creating at least one dynamic link between a dynamic port of an upstream mapping fragment of the plurality of mapping fragments and a dynamic port of a downstream mapping fragment of the plurality of mapping fragments, the dynamic link providing all data fields of the dynamic port to the dynamic port. Input is also received creating at least one static link between a static port of an upstream mapping fragment of the plurality of mapping fragments and a static port of a downstream mapping fragment of the plurality of mapping fragments, the static link providing a data field of the static port to the static port. One or more configuration parameters is received for applying to at least one mapping fragment of the plurality of mapping fragments, each configuration parameter including at least one configuration parameter value. Next, the configuration parameters are applied to the at least one mapping fragment by replacing each configuration parameter value of the one or more configuration parameters with a corresponding runtime value, and an executable runtime definition is compiled based at least in part on the definition of the data flow and the runtime values.

According to one embodiment, a non-transitory computer-readable memory storing a computer program executable by a processor produces a user interface with a data flow display area for displaying a data flow and a data flow icon selection area, adjacent to the data flow display area, comprising a plurality of icons for adding mapping fragments to the data flow. The user interface is configured by the computer program to display a new mapping fragment in the data flow display area, the mapping fragments including at least one data field group in response to receiving input selecting an icon of the plurality of icons in the data flow icon selection, where a dynamic port corresponds to a group of zero or more data fields, and a static port corresponds to one data field. The user interface is also configured to, in response to receiving input dragging a data field group or dynamic port of an upstream mapping fragment in the data flow display area to a downstream mapping fragment in the data flow display area, both display a visual connection between the upstream mapping fragment and the downstream mapping fragment indicative of a dynamic link and add the data fields of the data field group or the dynamic port of the upstream mapping fragment to a newly generated dynamic port in the downstream mapping fragment.

BRIEF DESCRIPTION OF THE DRAWINGS

FIG. 8 shows a snippet of XML code of a mapping fragment according to one embodiment.

FIG. 9 also shows a snippet of XML code of a mapping fragment according to one embodiment.

FIG. 10A shows a snippet of XML code of a compiled executable runtime definition of a data flow according to one embodiment.

FIG. 10B also shows a snippet of XML code of the compiled executable runtime definition of the data flow according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
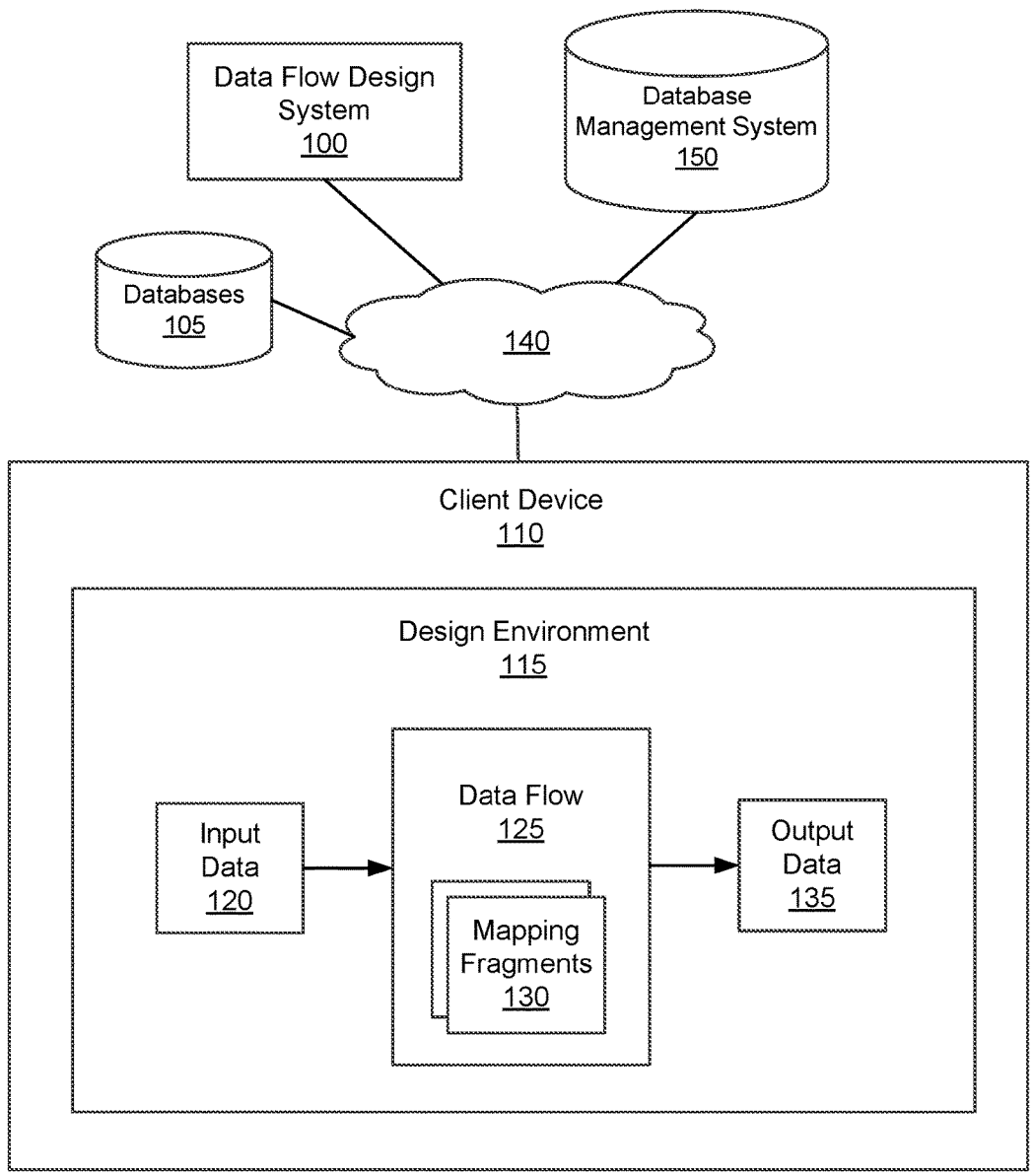
FIG. 1 is a diagram of a system environment of a data flow design system according to one embodiment.
Figure 2:
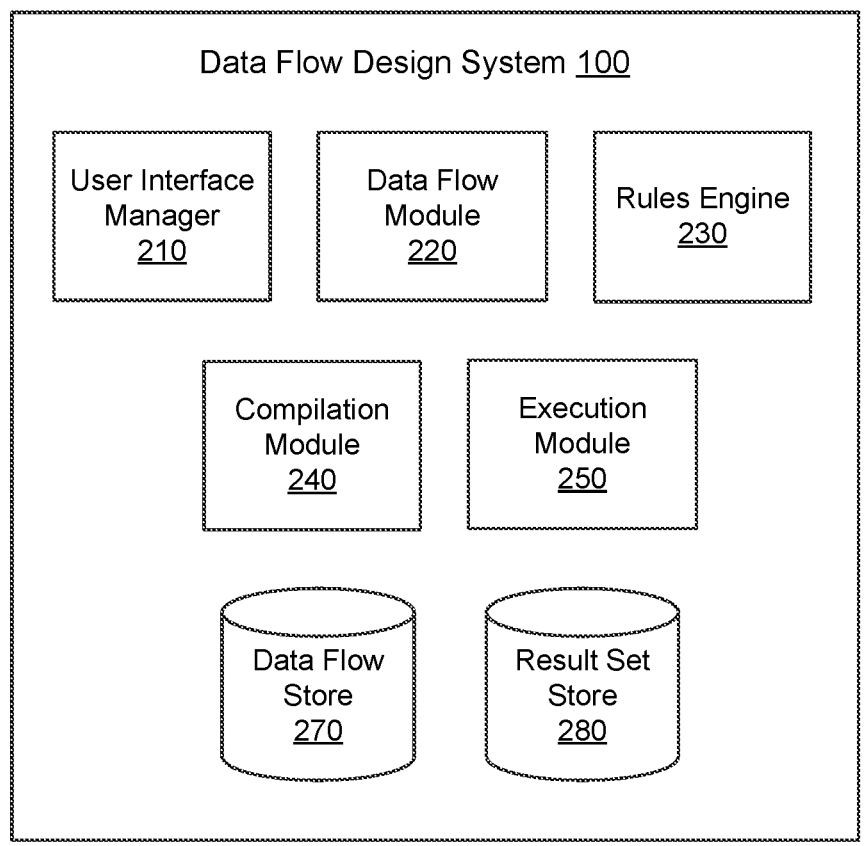
FIG. 2 is a diagram of a more detailed system architecture of the data flow design system within the system environment of FIG. 1 according to one embodiment.
Figure 3A:
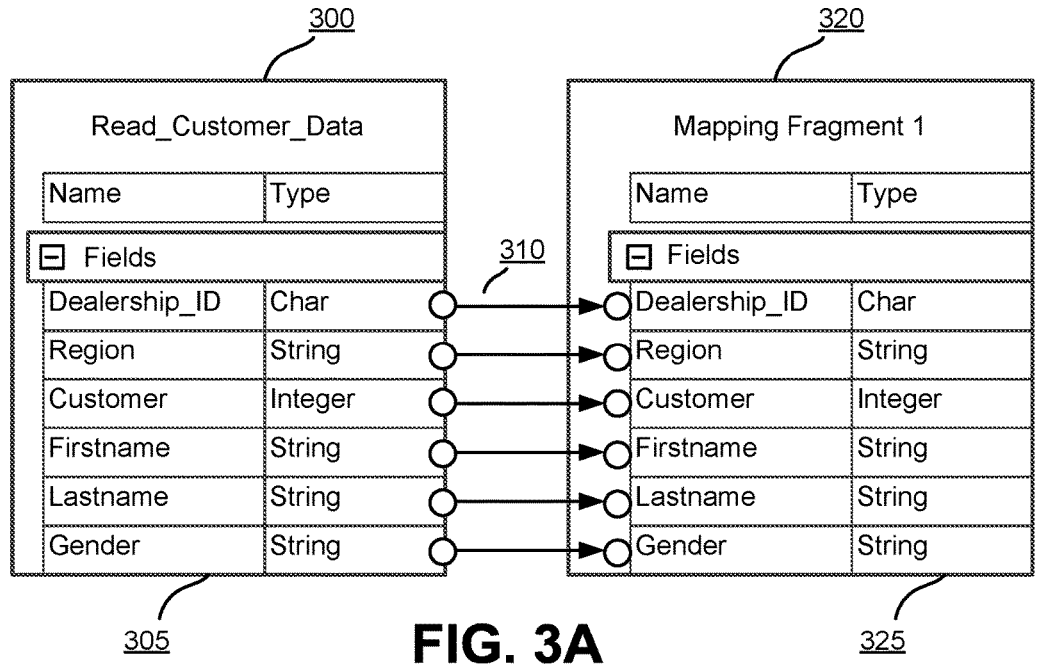
FIG. 3A shows an example of mapping fragments with static links according to one embodiment.
Figure 3B:
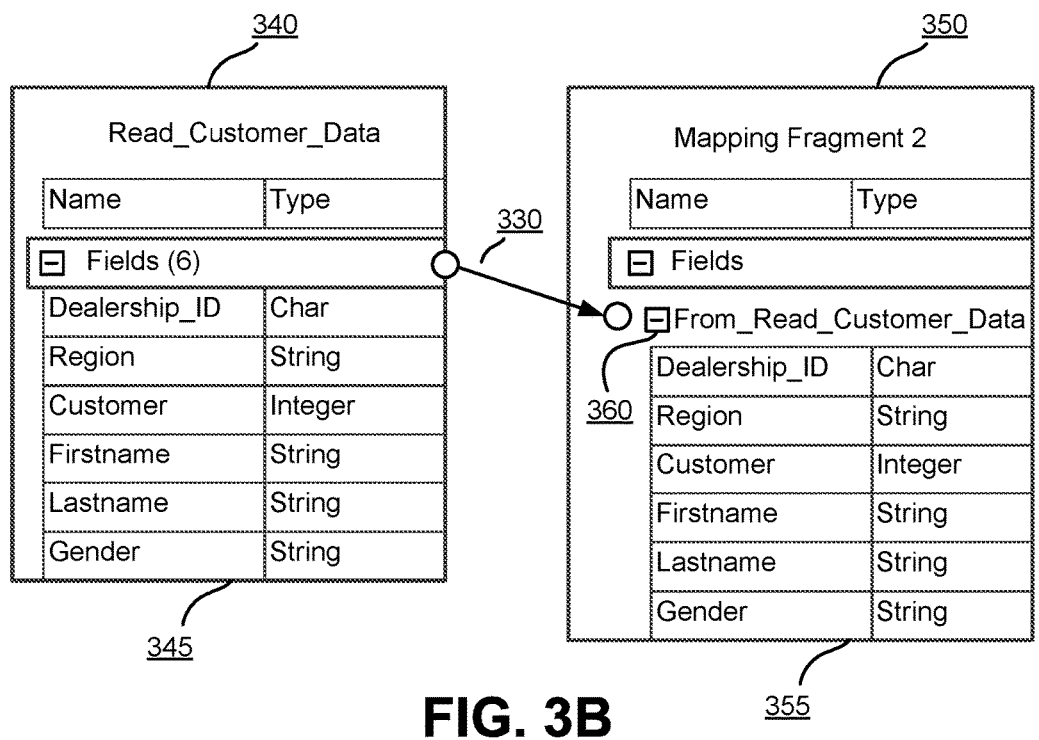
FIG. 3B shows an example of mapping fragments with a dynamic link according to one embodiment.
Figure 4A:
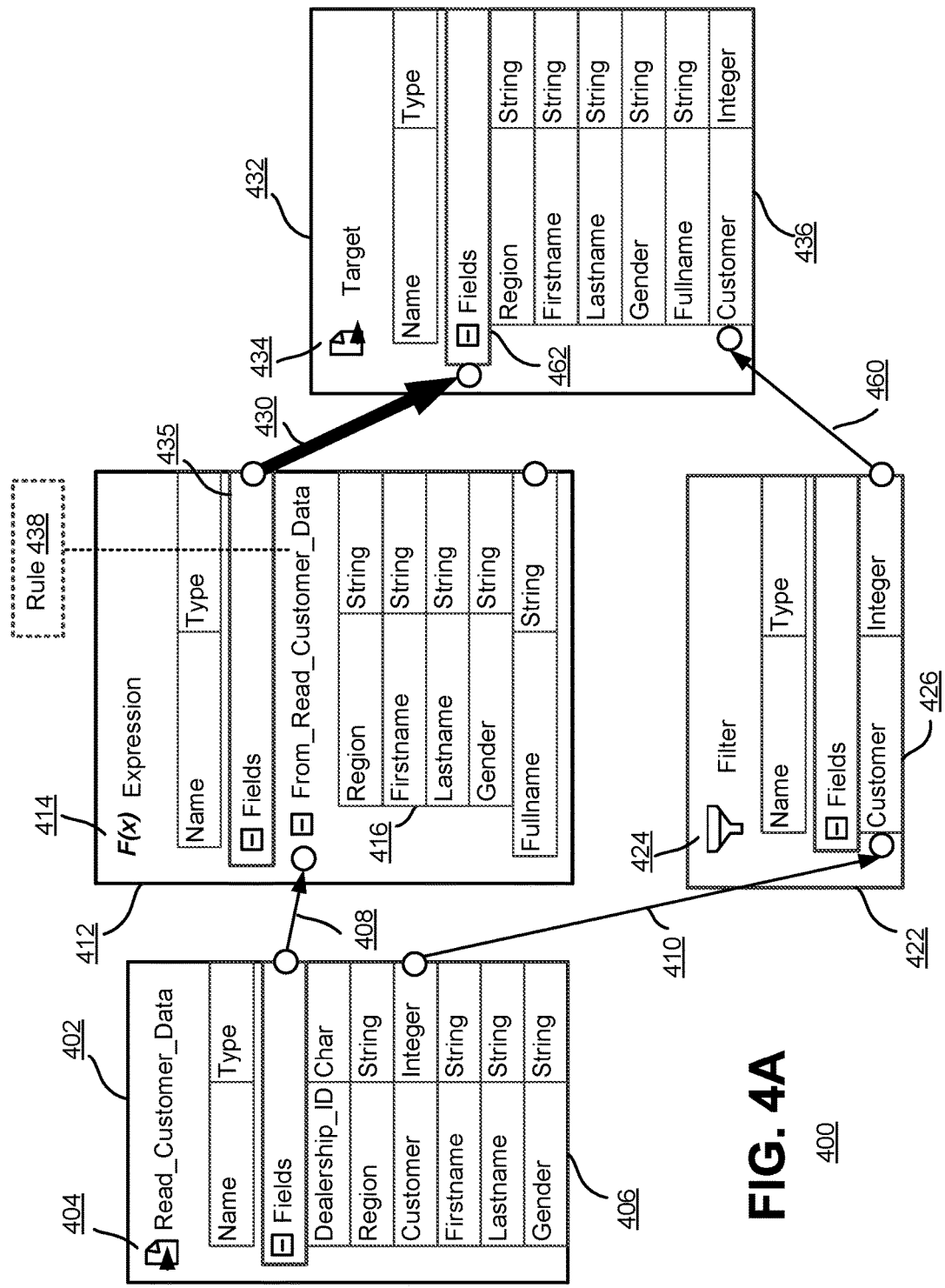
FIG. 4A is a diagram of a data flow including mapping fragments, static elements, and dynamic elements according to one embodiment.
Figure 4B:
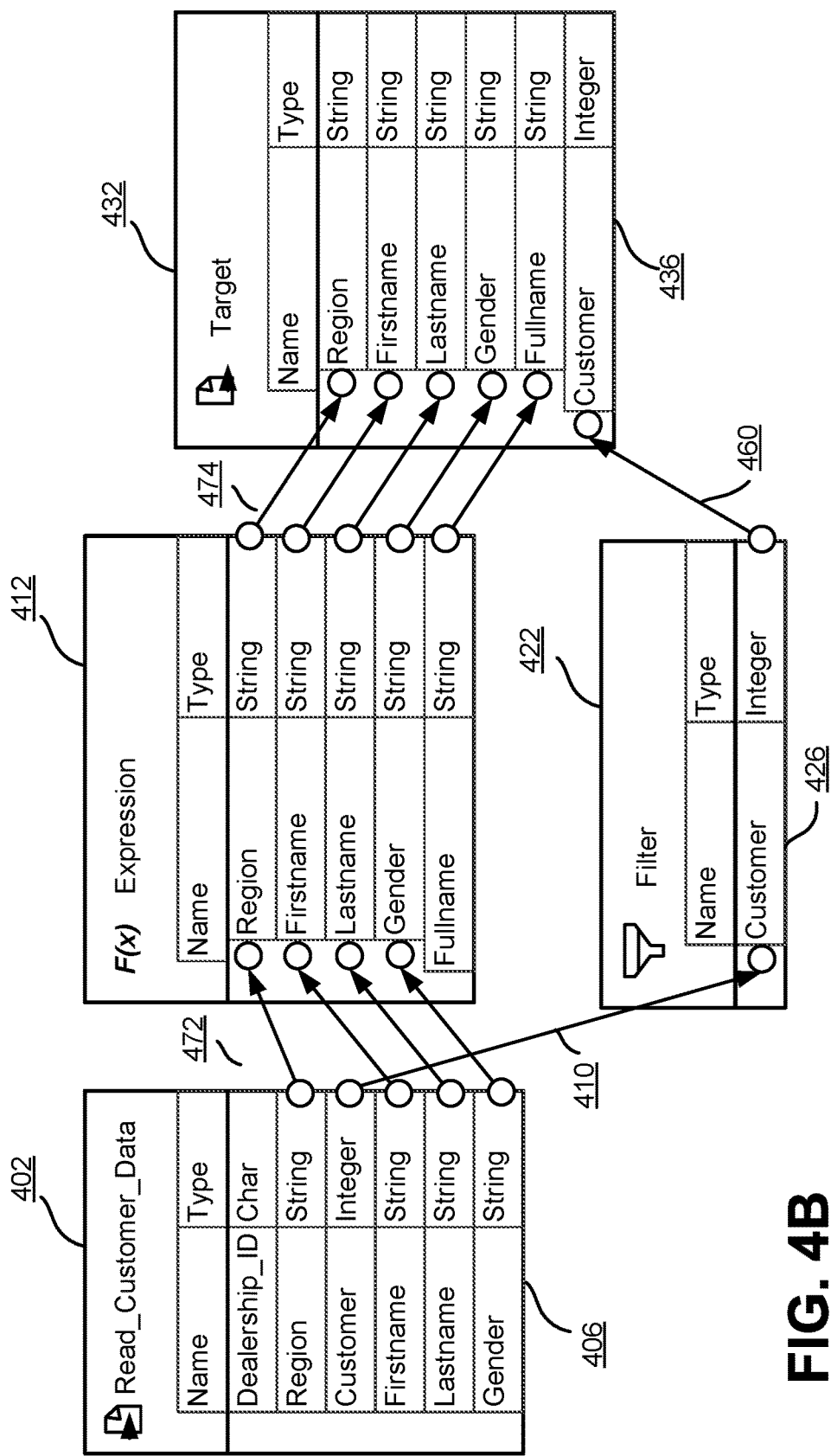
FIG. 4B is a diagram of a compiled version of the data flow shown in FIG. 4A according to one embodiment.
Figure 5:
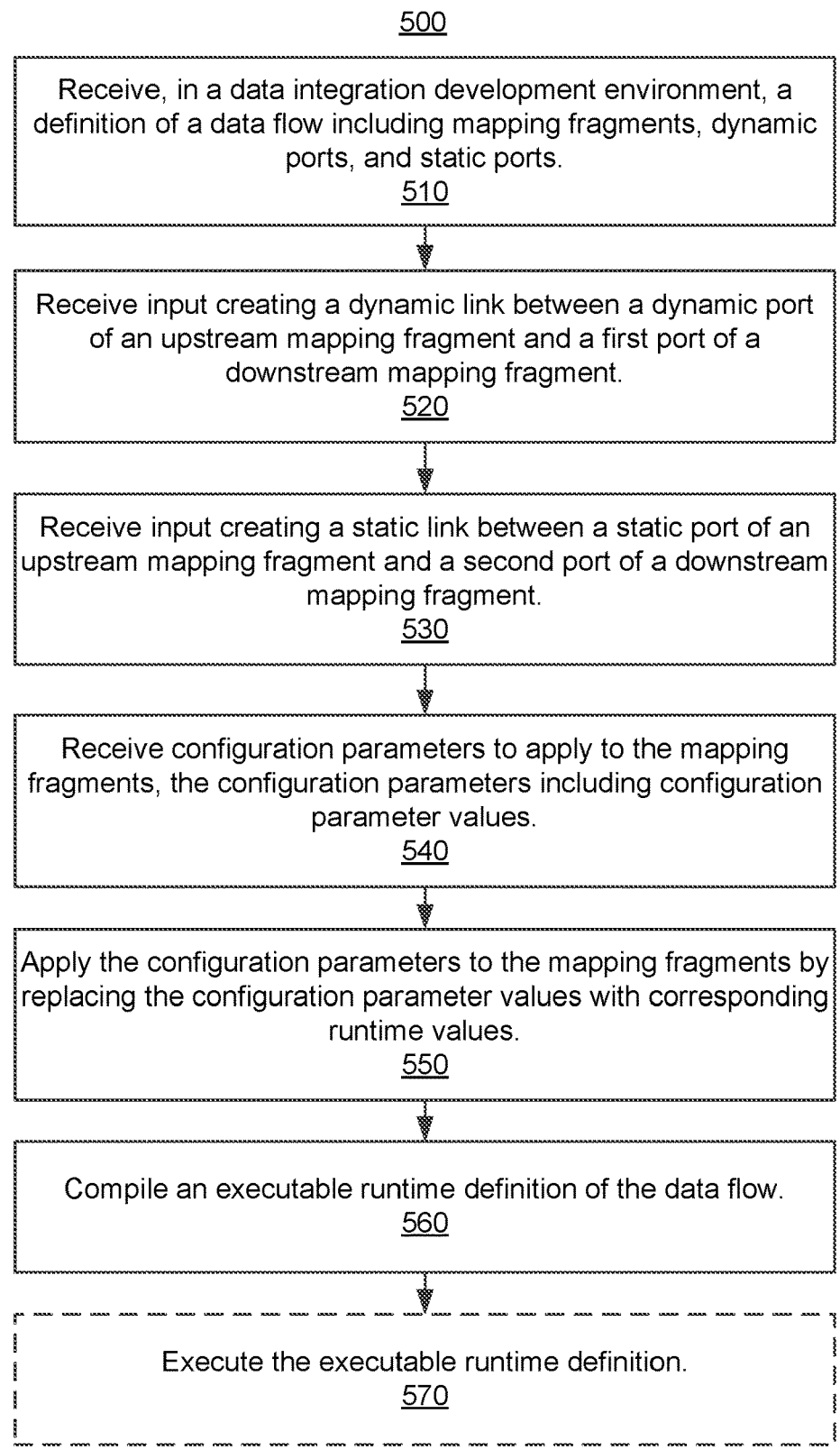
FIG. 5 is a flowchart of a process of designing a data flow according to one embodiment.

Particular embodiments as described herein relate to a data flow design environment using both static elements and dynamic elements. FIG. 1 and FIG. 2 show an overview of a data flow design system that uses mapping fragments to process input data and generate output data from online databases. FIGS. 3A-B illustrate example mapping fragments, static links, and dynamic links. FIG. 4A-B shows mapping fragments with configuration parameters to process the input data. FIG. 5 illustrates a process for designing data flows using the design environment. FIGS. 6A-G and FIG. 7 show example user interfaces of the design environment. FIGS. 8, 9, and 10A-B show snippets of XML code representing mapping fragments and compiled data flows.

System Overview

FIG. 1 is a diagram of a system architecture of a data flow design system 100 according to one embodiment. The system architecture includes a data flow design system 100, a client device 110, one or more databases 105, and a database management system 150, connected to each other over a network 140. In other embodiments, different and/or additional entities can be included in the system architecture.

The data flow design system 100 is a system for managing data flow information and is further described below with reference to FIG. 2. Generally, the data flow design system 100 provides a graphical user interface for a user to design data flows, enables the underlying data flows, and receives input from the user via the graphical user interface. The graphical user interface is also referred to as the design environment 115, which is displayed on the client device 110 of the user. Based on input received from the user, the data flow design system 100 stores information representing data flows designed by the user. The data flow design system 100 includes various components, discussed in greater detail below in conjunction with FIG. 2.

The database management system 150, also referred to as DBMS, is an application that interfaces the client device 110 to databases 105 over the network 140. Databases 105 are organized collections of data, for example, data tables, spreadsheets, reports, and other types of documents. The client device 110 (or the data flow design system 100) may retrieve information from—or write information to—a database, e.g., databases 105 or an online server, using the DBMS 150. In some embodiments, the data flow design system 100 and/or the client device 110 include local databases.

The client device 110 is a computing device that can receive input from a user of the client device 110 as well as transmit and receive data via the network 140. For instance, the client device 110 may be a desktop computer, laptop computer, smart phone, tablet, or any other device including computing functionality and data communications capabilities. Client device 110 is configured to communicate via the network 140, which may comprise any combination of local area or wide area networks, using both wired and wireless communication systems.

The network 140 enables communications between the client device 110 and the data flow design system 100. In one embodiment, the network 140 uses standard communications technologies and/or protocols. The data exchanged over the network 140 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

The design environment 115 is a graphical user interface for designing data flows using the data flow system 100. A user interacts with the design environment 115 using the client device 110, for example, to add, edit, or remove elements of a data flow. The design environment 115 displays a graphical representation of a data flow 125, input data 120, and output data 135. The data flow 125 receives the input data 120 from a source database, e.g., one of databases 105, using the DBMS 150. The data flow 125 processes the input data 120 using a set of mapping fragments 130, which are reusable objects that contain a set of one or more transformations. Mapping fragments apply the transformations to data that flows through the mapping fragments. Mapping fragments are further described with reference to FIGS. 3A-B and FIG. 4A. For reference, example snippets of XML code representations of mapping fragments are shown in FIGS. 8 and 9. Based on the application of the transformations, the data flow 125 generates the output data 135. The data flow 125 may write the output data 135 to a target database, e.g., one of databases 105, using the DBMS 150. In an example use case, the input data 120 includes information about customers of a business (e.g., first names and last names of customers who have purchased a product from the business), and may have one of the databases 105 as a source of the data. The data flow 125 formats customer information for display in a report (e.g., showing product purchases in the latest month) using the mapping fragments 130. The output data 135 is a representation of the report (e.g., a spreadsheet or text document), and may ultimately be stored in a target database, such as one of databases 105.

Data Flow Design System

FIG. 2 is a diagram of a system architecture 200 of the data flow design system 100 within the system environment of FIG. 1, according to one embodiment. The data flow design system 100 comprises a user interface manager 210, data flow module 220, rules engine 230, compilation module 240, execution module 250, data flow store 270, and rules set store 280. In other embodiments, the data flow design system 100 may include additional, fewer, and/or different modules and stores.

The user interface manager 210 generates the design environment 115, e.g., graphical user interface 600 as shown in FIG. 6A-F, including content and transformation information from the data flow design system 100. The content included in the design environment 115 includes graphical representations of elements of a data flow such as mapping fragments, which are described in more detail with reference to FIGS. 3A-B and 4. Additionally, an example user interface 600 is further described with reference to FIG. 6A-F. The user interface manager 210 may generate, and toggle between, different views of the data flow. For example, a condensed view of the data flow represents mapping fragments using icons (further described with reference to FIG. 7) smaller in size relative to corresponding graphical elements in a regular (i.e., non-condensed) view.

The design environment 115 generated by the user interface module 210 may also allow users of the data flow design system 100 to communicate information to the data flow design system 100. The user interface may include interactive elements (e.g., a graphical menu of different design controls) that allow a user to input data flow information, or input a request to the data flow design system 100 to perform an action. For example, a user uses the design controls to add, edit, or remove elements, e.g., mapping fragments, of a data flow. As an additional example, a user selects a "run" control to execute the data flow. Once the user interface module 210 has generated the design environment 115, the user interface module 210 presents the design environment 115 to users, for example, in a display area of the client device 110.

The data flow module 220 processes data flow information input by a user of the data flow design system 100. In particular, the data flow module 220 receives the data flow information from the user interface module 210 and stores the data flow information in the data flow store 270. For example, the data flow information describes a mapping fragment of a data flow that the user wants to design. The data flow module 220 generates a corresponding mapping fragment, associates the mapping fragment with the data flow, and stores the mapping fragment in the data store 270.

The rules engine 230 applies configuration parameters to mapping fragments of a data flow. Configuration parameters describe procedures to transform data, for example, a mathematical operation, a string operation, or a filter. In addition, configuration parameters may perform logic along with procedures, for example, performing a mathematical operation if a certain condition is satisfied (e.g., data flowing through the mapping fragment equals a target value). Configuration parameters include rules and/or macros, which are further described with reference to FIG. 4A. Configuration parameters include configuration parameter values and are represented in a markup language, e.g., XML, representation of a mapping fragment. The rules engine 230 applies configuration parameters to the mapping fragment by replacing the configuration parameter values with corresponding runtime values in the markup language. For example, a configuration parameter rule is represented by the XML, <Rule patternText="ABC123" />, where "patternText" refers to an identifier and "ABC123" refers to a configuration parameter value, i.e., another identifier for a different value, "test," defined in the XML of the mapping fragment. The rules engine 230 replaces the configuration parameter value with a runtime value corresponding to the identifier. Thus, after the configuration parameter rule is applied, the corresponding XML becomes <Rule patternText="test" />. The rules engine 230 traverses a data flow in topological order and executes any configuration parameters of mapping fragments in the data flow to generate a result set. The rules engine 230 provides the result set to downstream mapping fragments which may execute the result set. The rules engine 230 stores the result set in the rules set store 280 separate from the data flows stored in the data flow store 270.

The compilation module 240 compiles an executable runtime definition of a data flow. An example executable runtime definition of a data flow is further described with reference to FIG. 6G. For reference, example snippets of XML code representations of a compiled executable runtime definition of a data flow are shown in FIGS. 10A-B. The compilation module 240 receives the information about the data flow from the data flow store 270. The compilation module 240 compiles the executable runtime definition based on elements of the data flow such as mapping fragments, static ports, dynamic ports, and runtime links. In some embodiments, the compilation module 240 runs a proprietary engine to compile the executable runtime definition. If an input data source or output data source and/or system of the data flow changes, the compilation module 240 does not necessarily need to recompile the executable runtime definition.

Recompiling is avoided because data sources and/or systems typically evolve over time. Thus, eliminating the need to recompile a data flow due to non-data flow related changes saves time. Additionally, the data flow is more compact, easier to read, and more maintainable, e.g., the data flow dynamically adapts to changes to data sources and/or systems. In one embodiment, the compilation module 240 compiles the executable runtime definition in response to receiving input from the client device 110, via the user interface manager 200, requesting to compile the executable runtime definition (e.g., the request corresponding to the "run" design control further described with reference to FIG. 6A). The compilation module 240 provides the executable runtime definition to the execution module 250 for execution.

The execution module 250 executes an executable runtime definition of a data flow. The execution module 250 receives the executable runtime definition from the compilation module 240. In one embodiment, the execution module 250 executes the executable runtime definition in response to receiving input from the client device 110, via the user interface manager 200, requesting to execute the data flow. In an example use case, the execution module 250 reads input data and writes output data—e.g., input data 120 and output data 135 in FIG. 1, respectively—by executing the executable runtime definition.

The data flows described herein include static elements and/or dynamic elements. Static elements include static ports and static links, and dynamic elements include dynamic ports and dynamic links. Compared to static elements, dynamic elements differ in both function and visual appearance in the design environment 115. Users of the data flow design system 100 interact with the design environment 115 to add, remove, and/or edit mapping fragments, static elements and dynamic elements to design data flows.

Mapping Fragments

FIG. 3A shows an example of mapping fragments with static links 310 according to one embodiment. A mapping fragment has a name and includes data fields associated with a data field name and type. The data fields store data that flows through the mapping fragment in a data flow. For example, the mapping fragment 300 is named "Read_Customer_Data" and includes data fields 305. In particular, the data fields 305 include data fields corresponding to a customer's dealership identifier (i.e., data field name "dealership_ID"), region (i.e., data field name "region"), customer identifier (i.e., data field name "customer"), first name (i.e., data field name "firstname"), last name (i.e., data field name "lastname"), and gender (i.e., data field name "gender"). The data field "dealership_ID" is a character (char) type data field. The data field "customer" is an integer type data field. The data fields "region," "firstname," "lastname," and "gender" are string type data fields. In some embodiments, the data fields 305 include other data field groups, data field names, and/or data field types (e.g., decimal, date/time, float, Boolean, character, null, etc.). A data field group includes one or more data fields organized under a certain data field group name. A mapping fragment includes at least one data field group, i.e., a data field group including all data fields of the mapping fragment. Users may use the design environment 115 to create additional data field groups.

Mapping fragments include ports corresponding to one or more data fields. A static port is a traditional port that represents one data field. A dynamic port allows multiple data fields to flow into a mapping fragment over a link, which is further described below. For example, the mapping fragment 300 includes a static port representing each of the data fields "dealership_ID," "region," "customer," "firstname," "lastname," and "gender." Further, the mapping fragment 300 may also include a dynamic port that allows all—e.g., six—data fields of the mapping fragment 300 to flow through a link of the mapping fragment 300.

Data flows may include different types of mapping fragments each corresponding to a different type of transformation. For example, types of mapping fragments include "read data," "target," "expression," "aggregator," "joiner," and "filter," among others. A "read data" type mapping fragment retrieves information from a source database, e.g., one of databases 105, via the DBMS 150. The retrieved information may be further processed by other mapping fragments of a data flow. A "target" type mapping fragment writes information to a target database, e.g., one of databases 105, via the DBMS 150. The information is based on data processed by mapping fragments of a data flow. An "expression" type mapping fragment performs an expression on data from a data field, e.g., performing the expression row by row. For example, the expression is a mathematical operation performed on numerical type data (e.g., multiplying an integer by a scaling factor or determining the absolute value of a decimal). In another example, the expression is a string operation performed on string type data (e.g., concatenating a string, trimming space characters from a string, or determining a substring). An "aggregator" type mapping fragment performs an expression on groups of data from the data fields. For example, the expression determines the sum of integer type data from multiple data fields or concatenates string type data from multiple data fields. A "joiner" type mapping fragment combines data from multiple heterogeneous (or homogeneous) input data from multiple source databases, e.g., databases 105. Heterogeneous input data includes input data that have different formats or types of data fields. For example, one input data is a table of integers, while a second input data is a text document of characters and/or strings. A "filter" type mapping fragment selects data to flow through the mapping fragment based on data field values or another condition. For example, a mapping fragment only selects records where "country=USA" (i.e., the string value of "country" equals the string "USA") to flow through the mapping fragment. Different types of mapping fragments include different types of icons to visually differentiate the mapping fragments from each other, which are further described with reference to FIG. 4A.

FIG. 8 shows a snippet of XML code of a mapping fragment according to one embodiment. In particular, the mapping fragment includes instances of transformations, e.g., "<Instance transformation="U:7PeivxI0 . . . " Instances of transformations are analogous to function calls of a program because the instances do not necessary include instructions for applying a transformation. Rather, e.g., the instances may include references to other portions of code. The instances include multiple ports, e.g., "<TransformationFieldPort imx:id="ID_6" . . . " and fields, e.g., "transformationField="U:7PeiwR . . . ," which are used as input parameters to a transformation. In some embodiments, the input parameters are not known during design time, but are determined by runtime of a data flow.

FIG. 9 also shows a snippet of XML code of a mapping fragment according to one embodiment. In particular, the mapping fragment is an expression type mapping fragment that performs a string operation on data flowing through the mapping fragment.

Static Links

In a data flow, a static link maps a static port of an upstream mapping fragment to an input port of a downstream mapping fragment. An upstream mapping fragment is a mapping fragment that precedes a downstream mapping fragment in the data flow. For example, the static links 310 shown in FIG. 3A include six static links each corresponding to one of the data fields 305 of the upstream mapping fragment 300. Each static link is mapped to an input port corresponding to one of the data fields 325 of downstream mapping fragment 320 named "mapping fragment 1." Thus, data from the data fields 305 of the upstream mapping fragment 300 flow through the static links 310 to the data fields 325 of the downstream mapping fragment 320.

Dynamic Links

FIG. 3B shows an example of mapping fragments with a dynamic link 330 according to one embodiment. Mapping fragment 340 includes a data field group named "Fields (6)" that allows data from all—e.g., six—of the data fields 345 to flow through the dynamic port and to the dynamic link 330. The dynamic link 330 maps the "Fields (6)" data field group to an input port named "From_Read_Customer_Data" (e.g., based on the name of the upstream mapping fragment 340) of downstream mapping fragment 350. Due to the dynamic link 330, the mapping fragment 350 generates generated ports organized under the "From_Read_Customer_Data" input port, i.e., a dynamic port. A generated port is used in a mapping fragment in a similar way to a static port. However, generated ports may be removed or added to a mapping fragment at runtime as result of changes to an upstream mapping fragment of a data flow. Specifically, mapping fragment 350 includes six generated ports corresponding to each of the data fields 355, i.e., the character type data field named "dealership_ID," the integer type data field named "customer," as well as the string type data fields named "region," "firstname," "lastname," and "gender." Data from the data fields 345 flow through the dynamic link 330 to the data fields 355. A user of the data flow design system 100 may toggle between viewing and hiding generated ports by selecting an expander control 360 of the dynamic port "From_Read_Customer_Data." In other embodiments, dynamic links map a dynamic port of an upstream mapping fragment to a port of a downstream mapping fragment.

Static elements and dynamic elements each have different features. In particular, static elements provide more repeatability than dynamic elements, which is useful for designing data flows with mainly fixed data structures. For example, a fixed data structure is a mapping fragment that maintains the same number and types of data fields over time, or experiences a minimal amount of modifications to data fields. On the other hand, dynamic elements provide more data flow design flexibility than static elements. That is, dynamic elements such as dynamic ports and dynamic links are more adaptable to changes in a data flow.

Data Flows

FIG. 4A is a diagram of a data flow 400 including mapping fragments, static elements, and dynamic elements according to one embodiment. The data flow 400 includes a mapping fragment 402 named "Read_Customer_Data," mapping fragment 412 named "Expression," mapping fragment 422 named "Filter," and mapping fragment 432 named "Target." Mapping fragment 402 is a "read data" type mapping fragment, and thus has a "read data" type icon 404.

Mapping fragment 422 is a "filter" type mapping fragment, and thus has a "filter" type icon 424. Mapping fragment 412 is an "expression" type mapping fragment, and thus has an "expression" type icon 414. Mapping fragment 432 is a "target" type mapping fragment, and thus has a "target" type icon 434.

The dynamic link 408 maps a data field group of upstream mapping fragment 402 to the input dynamic port "From_Read_Customer_Data" of downstream mapping fragment 412. The input dynamic port has a "strings-only" inclusion rule, i.e., rule 438. Thus, only the data from the four string type data fields, e.g., "region," "firstname," "lastname," and "gender" from the upstream mapping fragment 402 flow through the dynamic link 408 to the input dynamic port "From_Read_Customer_Data." Thus, mapping fragment 412 generates a generated port 416 for each data field of the data field group.

Mapping fragment 412 also has a "fullname" output static port whose value depends on an expression that performs a string operation. The expression performs a string operation on the "firstname" and "lastname" data fields of mapping fragment 412. In particular, the expression is applied by concatenating the string data of "lastname" to the end of the string data of "firstname" to generate the data value stored in the "fullname" dynamic port. For instance, "Curie" concatenated to the end of "Marie" results in the "fullname" data value, "Marie Curie." In this example, the expression also inserts a space character between "firstname" and "lastname."

The static link 410 maps a static port representing the "customer" data field of upstream mapping fragment 402 to the input static port representing the "customer" data field of the downstream mapping fragment 422. Thus, data from the "customer" data field of data fields 406 flows through the static link 410 to the "customer" data field of data fields 426. The static link 460 maps a static port of the "customer" data field of data fields 426 to an input static port of the downstream mapping fragment 432. Since the mapping fragment 422 is a "filter" type mapping fragment, it may apply configuration parameter rules to exclude or include certain data fields based on their data field values. For example, the mapping fragment 422 may have a configuration parameter rule that only includes "Customer >50000," i.e., values of "customer" that are greater than 50000.

Runtime links handle situations where an upstream mapping fragment has dynamic elements, but a corresponding downstream mapping fragment does not support dynamic elements. Specifically, runtime links include information for generating links at runtime between generated ports in the upstream mapping fragment and static ports in the downstream mapping fragment. An example of generated links due to the runtime link 430 is further described below with reference to FIG. 4B. The runtime link 430 maps the "Fields" data field group 435 of the upstream mapping fragment 412 to the "Fields" data field group 462 of the downstream mapping fragment 432. In the design environment 115 user interface, a runtime link is graphically distinct from static links and dynamic links. For example, the runtime link 430 is represented by a thicker line than the dynamic link 408, e.g., the runtime link 430 is seven pixels wide, while the dynamic link 408 is one pixel wide. In some embodiments, runtime links are represented in a different color or transparency level than static links and/or dynamic links. Runtime links provide data flow design flexibility because certain inputs or configurations of a data flow may not be known until runtime (execution of a data flow). Thus, runtime links supplement static links that, in contrast, operate using inputs and configurations that are known before runtime.

Since the data flow 400 includes static links 410 and 460, a dynamic link 408, and a runtime link 430, the data flow 400 combines both static elements and dynamic elements. Thus, a user designing the data flow 400 using the design environment 115 may customize the data flow 400 based on different types of data sources and/or data processing procedures. The combination of static elements and dynamic elements helps unify input data from a variety of source databases, e.g., because a certain input data may only support static elements, but not dynamic elements. Further, another input data may need to be re-formatted by a mapping fragment to match the format of a different input data. The user also customizes data flows by creating configuration parameters (e.g., rules describing filters, mathematical operations, or string operations) to apply to mapping fragments. The user uses static elements for sections of the data flow 400 that requires more repeatability and is less likely to change. The user uses the static links 410 and 460 because the "customer" data field remains the same over time, e.g., because a customer will keep the same customer identifier represented by the data value of the "customer" data field. Additionally, the user uses the dynamic link 408 because the string type data fields are likely to change over time. For example, the user adds an additional string type data field for a customer's "middlename," "city," or "state" to the mapping fragment 402. The dynamic link 408 adapts to the change by automatically generating a new generated port in a mapped downstream mapping fragment corresponding to the additional string type data field.

FIG. 4B shows a compiled executable runtime definition 470 of the data flow 400 shown in FIG. 4A according to one embodiment. In particular, the compilation module 240 generates links of the data flow 400 based on any dynamic links or runtime links. For example, the compilation module 240 replaces the dynamic link 408 with a set of four static links 472 each mapping a static port of upstream mapping fragment 402 to a static port of downstream mapping fragment 412. Additionally, the compilation module 240 replaces the runtime link 430 with a set of five static links 474 each mapping a static port of upstream mapping fragment 412 to a static port of downstream mapping fragment 432. The compilation module 240 removes dynamic ports and data field groups from mapping fragments of the data flow 400. Note that the static links 410 and 460 are unchanged. In some embodiments, the compilation module 240 converts text type data fields into string type data fields, or performs other types of data field type conversions when compiling executable runtime definitions of data flows.

FIG. 10A shows a snippet of XML code of a compiled executable runtime definition of a data flow according to one embodiment. The compiled executable runtime definition code includes, e.g., tags "<Characteristic>," "<inputBinding>," "<Capability>," and "<Relational Field>," representing characteristics, input bindings, capabilities, and relational fields, respectively. A characteristic, e.g., "<Characteristic imx:id="ID_2" xsi:type="optimizer:OptimizerCharacteristic">"," may further describe functions of a mapping fragment, for example, whether the mapping fragment is designed to run in a specific environment (e.g., a cloud database or a local engine). An input binding, e.g., <InputBinding imx:id="ID_5" . . . ," may indicate how a runtime value is provided to a mapping fragment.

FIG. 10B also shows a snippet of XML code of the compiled executable runtime definition of the data flow according to one embodiment. A capability, e.g., "<Capability imx:id="ID_61" xsi:type="datasourceoperationl:ReadCapability" . . . ," may indicate a signature of a data source, e.g., for a "read data" or "target" type mapping fragment. Example signatures include read, write, and look up. A relational field, e.g., "<RelationalField imx:id="ID_64" . . . ," may describe an element within a signature of a capability. Since relational fields are associated with a capability, mapping fragments can be compatible with a variety of data source types.

Process Flow

FIG. 5 is a flowchart of a process 500 of designing a data flow according to one embodiment. In some embodiments, the process 500 is used by the data flow design system 100—e.g., modules of the data flow design system 100 described with reference to FIG. 2—within the system environment in FIG. 1. The process 500 may include different or additional steps than those described in conjunction with FIG. 5 in some embodiments or perform steps in different orders than the order described in conjunction with FIG. 5. The process 500 is described in the context of an example use case where a user of the data flow design system 100 is the owner of a car dealership business. The user wants to generate sales reports at the end of each month to help make projections for sales in upcoming months, study customer behaviors, and evaluate the overall performance of the business, among other uses. Thus, the user uses a data integration development environment, e.g., user interface 600 illustrated in FIGS. 6A-F, to design a data flow that generates sales reports.

The data flow design system 100 receives 510, in the data integration development environment, a definition of a data flow from a client device 110 via the user interface manager 210 described in FIG. 2. The definition of the data flow includes mapping fragments, e.g., mapping fragments 620, 628, 634, and 640 shown in FIG. 6D, with data fields corresponding to dynamic ports and static ports. The mapping fragment 620 retrieves data about the business' customers via the DBMS 150 from a source such as a spreadsheet, database, or any other digital record of customer data logged by the user. The data flow design system 100 receives 520, via the user interface manager 210, input creating a dynamic link between a data field group of an upstream mapping fragment and a data field group of a downstream mapping fragment. For example, in FIG. 6E, the dynamic link 648 maps the dynamic port "From_Read_Customers" of upstream mapping fragment 628 to the dynamic port "From_Expression" of downstream mapping fragment 640. The data flow design system 100 receives 530, via the user interface manager 210, input creating a static link between a static port of an upstream mapping fragment and a static port of a downstream mapping fragment. For example, in FIG. 6F, one of the static links 658 maps a static port corresponding to the "price" data field of upstream mapping fragment 634 to a static port of a corresponding "price" data field of the downstream mapping fragment 640. The user interface manager 210 provides the data flow to the client device 110 for display to the user in the design environment. In some embodiments, the data flow is represented by a condensed icon view, e.g., including icons shown in FIG. 7.

The data flow design system 100 receives 540, from the client device 110 via the user interface manager 210, configuration parameters associated with the mapping fragments. For example, referring back to FIG. 4A, configuration parameter rule 438 is associated with the "From_Read_Customer_Data" dynamic port of mapping fragment 412. The configuration parameters include configuration parameter values, e.g., the configuration parameter rule 438 has a configuration parameter value corresponding to a string data type filter. The rules engine 230 applies 550 the configuration parameters to the mapping fragments by replacing the configuration parameter values with corresponding runtime values. The compilation module 240 compiles 560 an executable runtime definition of the data flow (e.g., the executable runtime definitions shown in FIG. 4B or FIG. 6G).

According to one embodiment, the execution module 250 executes 570 the executable runtime definition to generate output sales report data, e.g., stored to a target database, e.g., one of databases 105, via the DBMS 150. In other embodiments the execution may be initiated from an entity outside the data flow design system 100. For example, the sales report organizes the customers based on demographic information, e.g., age, gender, or ethnicity. To achieve this organization, the user may use configuration parameter rules that filter data based on data values of data fields representing demographic information, e.g., the "gender" data field shown in FIG. 4A. Based on the sales report, the user may determine that most customers are in the 18-25 years old age range. Further, the user uses configuration parameters corresponding to mathematical expressions to determine total revenue earned from customers in the age range. Thus, the user may focus on advertising cars popular to 18-25 year olds in the next month. If the user stores new customer data on a new online server accessible by the data flow system 100 via the DBMS 150, then the data flow does not need to be recompiled before executing. The execution module 250 resolves any runtime links, e.g., runtime link 430 shown in FIG. 4A, when executing the executable runtime definition.

Design Environment User Interface

An example data flow user interface 600 is shown in FIGS. 6A-F. A user of the data flow design system 100 designs data flows with mapping fragments, static elements, and dynamic elements using the user interface 600.

Figure 6A:
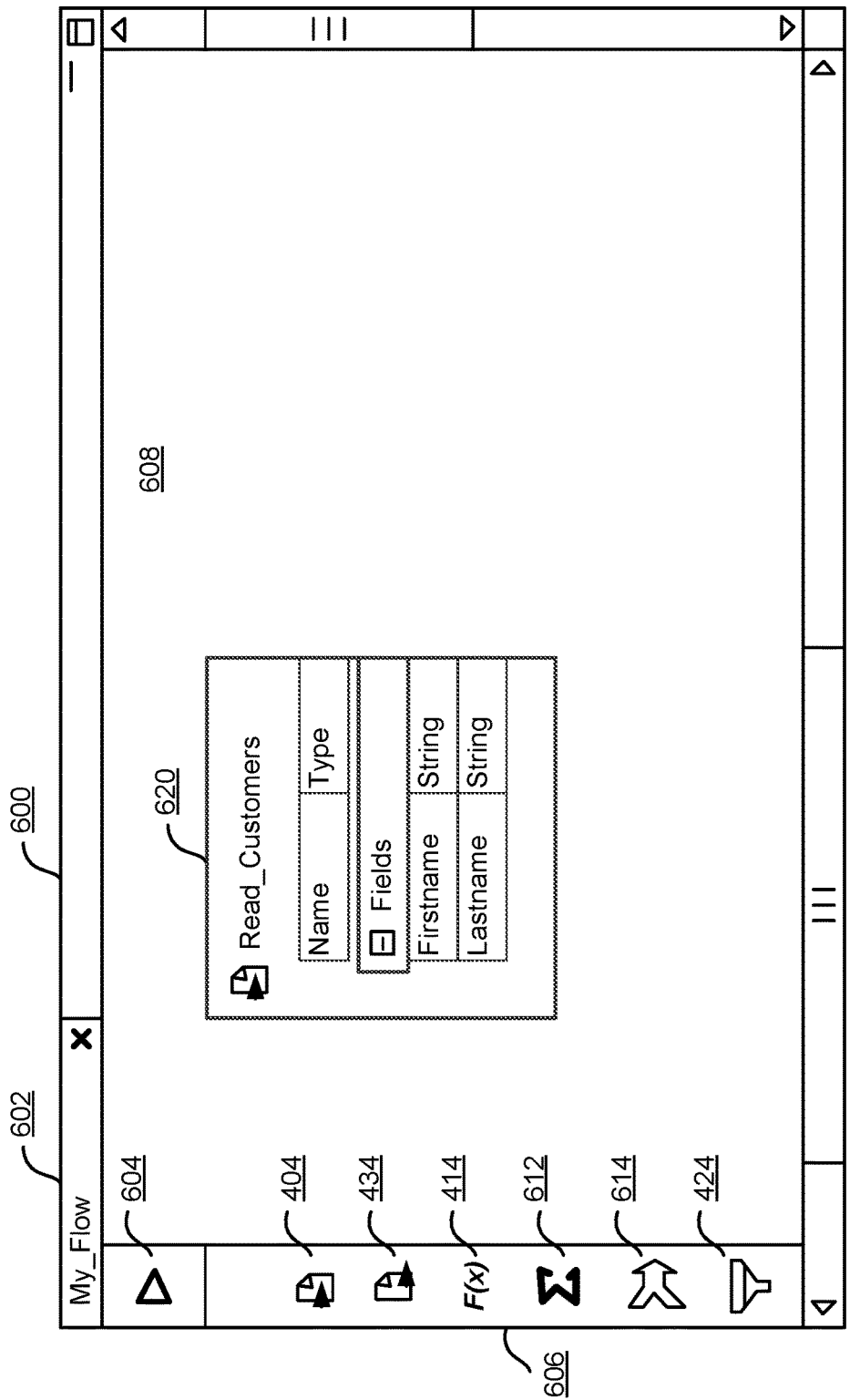
FIG. 6A shows a data flow design environment user interface according to one embodiment.

FIG. 6A shows the data flow design environment user interface 600 according to one embodiment. The user interface 600 is an embodiment of the design environment 115 shown in FIG. 1, and includes a data flow 602 named "My_Flow," a display area 608 for displaying the data flow 602, and a menu 606 user interface. The display area 608 includes a "read data" type mapping fragment 620 named "Read_Customers" of the data flow 602.

The menu 606 includes different types of design control icons that are selectable by a user. FIG. 6A shows seven design control icons in the menu 606, though in other embodiments, menus may include additional, different, and/or fewer design control icons. The user interface manager 210 receives input, via a client device 110 from a user designing the data flow 602, indicating selections of the design control icons. Based on the selections, the data flow design system 100 performs a corresponding function. For example, if the selection corresponds to the "run" design control icon 604, the compilation module 240 compiles an executable runtime definition of the data flow 602, and the execution module 250 executes the executable runtime definition. The user selects the "read data" design control icon 404 or the "target" design control icon 434, to add a "read data" type mapping fragment or a "target" type mapping fragment to the data flow 602, respectively. Similarly, the user selects the "expression" design control icon 414, "aggregator" design control icon 612, "joiner" design control icon 614, or "filter" design control icon 424 to add an "expression" type mapping fragment, "aggregator" type mapping fragment, "joiner" type mapping fragment, or "filter" type mapping fragment to the data flow 602, respectively.

Figure 6B:
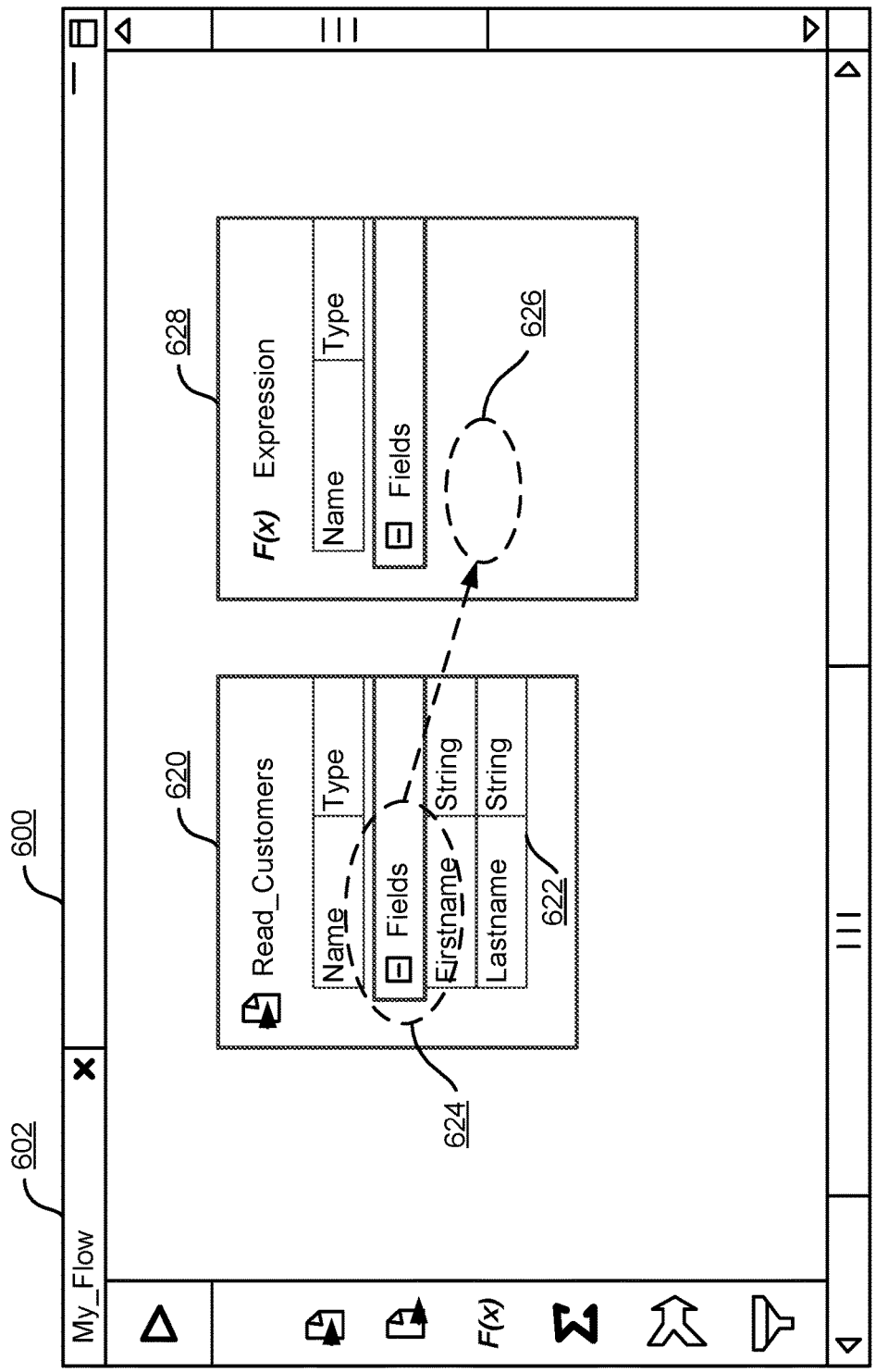
FIG. 6B shows the data flow design environment user interface illustrating a drag and drop feature according to one embodiment.

FIG. 6B shows the data flow user interface 600 illustrating a drag and drop feature according to one embodiment. Compared to the data flow 602 shown in FIG. 6A, the data flow 602 shown in FIG. 6B includes an additional "expression" type mapping fragment 628 named "Expression," e.g., as result of the user selecting the "expression" design control icon 414 in FIG. 6A. The user interface manager 210 receives input indicating a "drag and drop" action from the user via the client device 110. For instance, the user selects the area 624 corresponding to the "fields" data field group of mapping fragment 620 that represents a group of all data fields 622 of mapping fragment 620, i.e., the "firstname" and "lastname" data fields. The user "drags" the selection of area 624 to the mapping fragment 628 and "drops" the selection to the area 626 inside the mapping fragment 622. Accordingly, the user interface manager 210 logs the "drag and drop" action and provides input information to the data flow module 220. Based on the input information, the data flow module 220 generates a dynamic link between upstream mapping fragment 620 and downstream mapping fragment 628, which is further described below with reference to FIG. 6C.

Figure 6C:
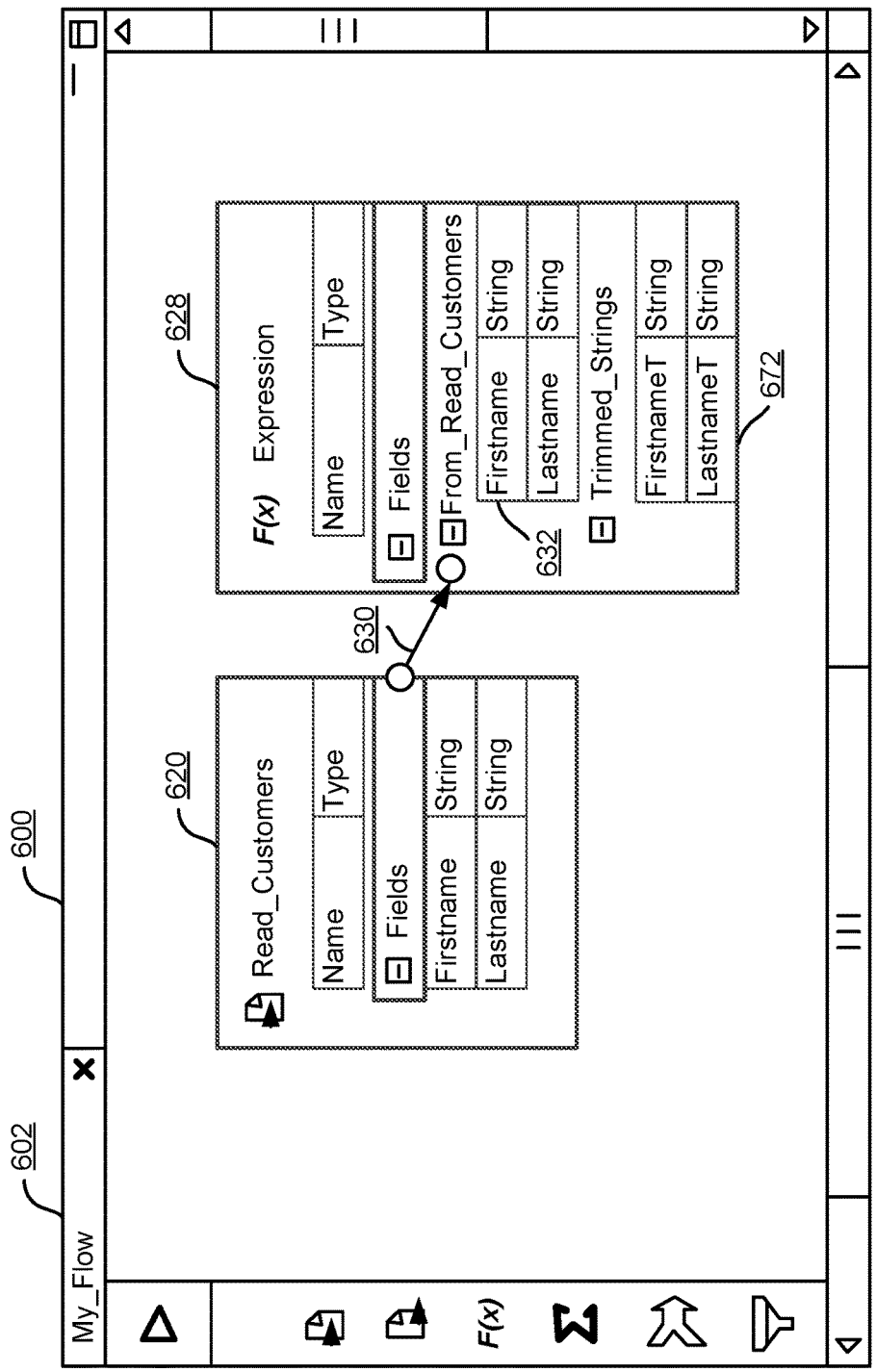
FIG. 6C shows the data flow design environment user interface illustrating a dynamic link according to one embodiment.

FIG. 6C shows the data flow user interface 600 illustrating a dynamic link 630 according to one embodiment. Compared to the data flow 602 shown in FIG. 6B, the data flow 602 shown in FIG. 6B includes the additional dynamic link 630, e.g., as result of the "drag and drop" action from the user shown in FIG. 6B. The dynamic link 630 maps the "Fields" dynamic port of upstream mapping fragment 620 to the input "From_Read_Customers" dynamic port of downstream mapping fragment 628. The "From_Read_Customers" dynamic port includes two generated ports 632 each corresponding to a data field of the "Fields" dynamic port.

The "Fields" data field group of mapping fragment 628 now includes a "Trimmed_Strings" dynamic port added by the user. The "Trimmed_Strings" dynamic port has a macro configuration parameter, also referred to as a macro. Generally, a dynamic port with a macro applies a procedure to one or more other dynamic ports to generate new generated ports. For example, the macro of the "Trimmed_Strings" dynamic port applies a left trim string operation (i.e., removing leading space characters on the left side of a string) on each string type data field of the "From_Read_Customers" dynamic port. Further, a generated port under "Trimmed_Strings" is generated for each string type data field of the "From_Read_Customers" dynamic port. Thus, the "Trimmed_Strings" dynamic port includes two generated ports 672, "firstnameT" and "lastnameT," which store the left trim values of the "firstname" and "lastname" data fields of "From_Read_Customers," respectively.

Figure 6D:
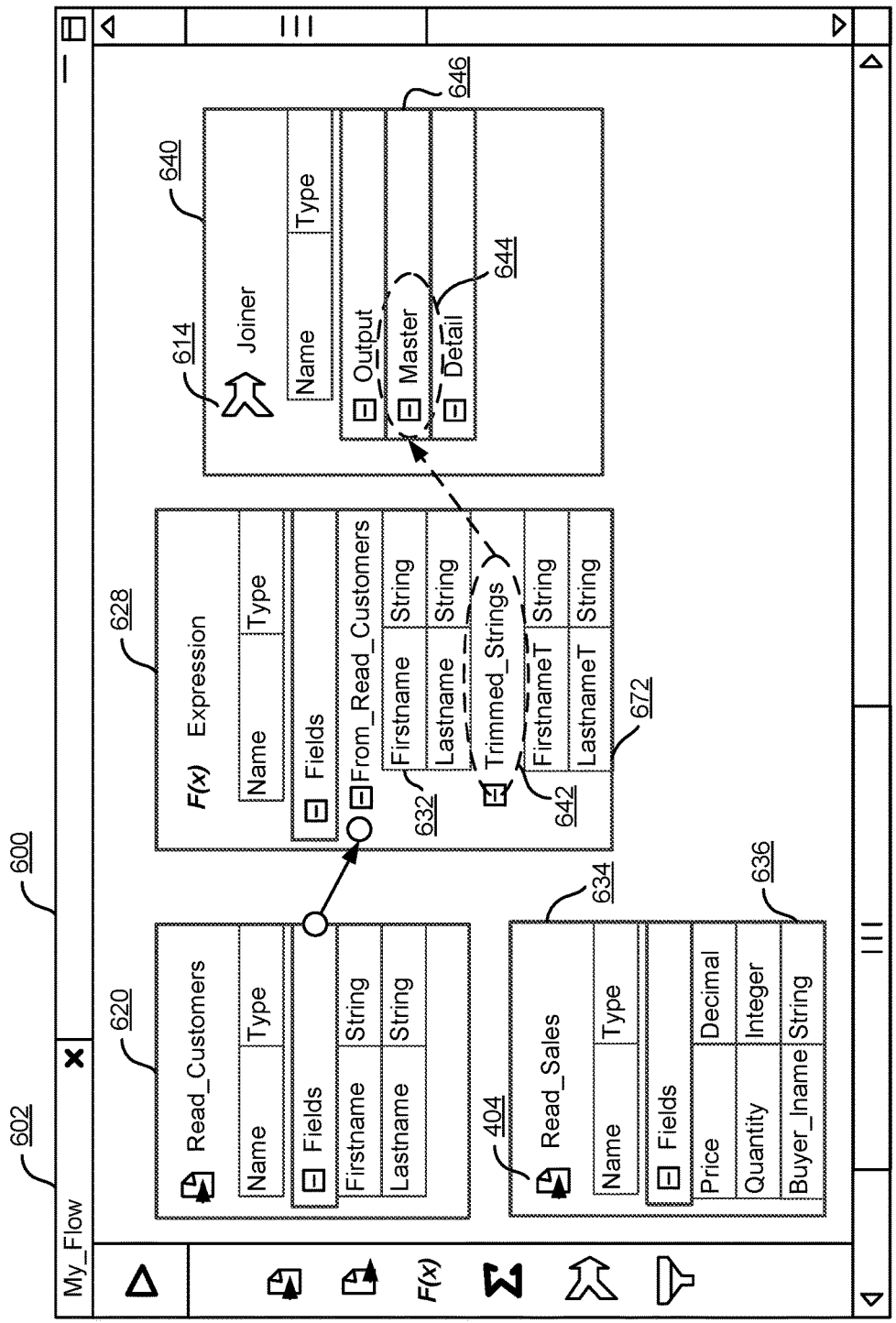
FIG. 6D also shows the data flow design environment user interface according to one embodiment.

FIG. 6D also shows the data flow user interface 600 according to one embodiment. Compared to the data flow 602 shown in FIG. 6C, the data flow shown in FIG. 6D includes an additional "read data" type mapping fragment 634 named "Read_Sales" and an additional "joiner" type mapping fragment 640 named "Joiner," e.g., as result of the user selecting the "read data" design control icon 404 and the "joiner" design control icon 614, respectively. The user interface module 210 receives input indicating another "drag and drop" action from the user via the client device 110. For instance, the user selects the area 642 corresponding to the "Trimmed_Strings" dynamic port of mapping fragment 628 that represents the generated ports 672 of mapping fragment 628. The user "drags" the selection of area 642 to the mapping fragment 640 and "drops" the selection to the area 644 inside the mapping fragment 640 corresponding to the "Master" data field group 646. Accordingly, the data flow module 220 generates a dynamic link between upstream mapping fragment 628 and downstream mapping fragment 640, which is further described below with reference to FIG. 6E.

Figure 6E:
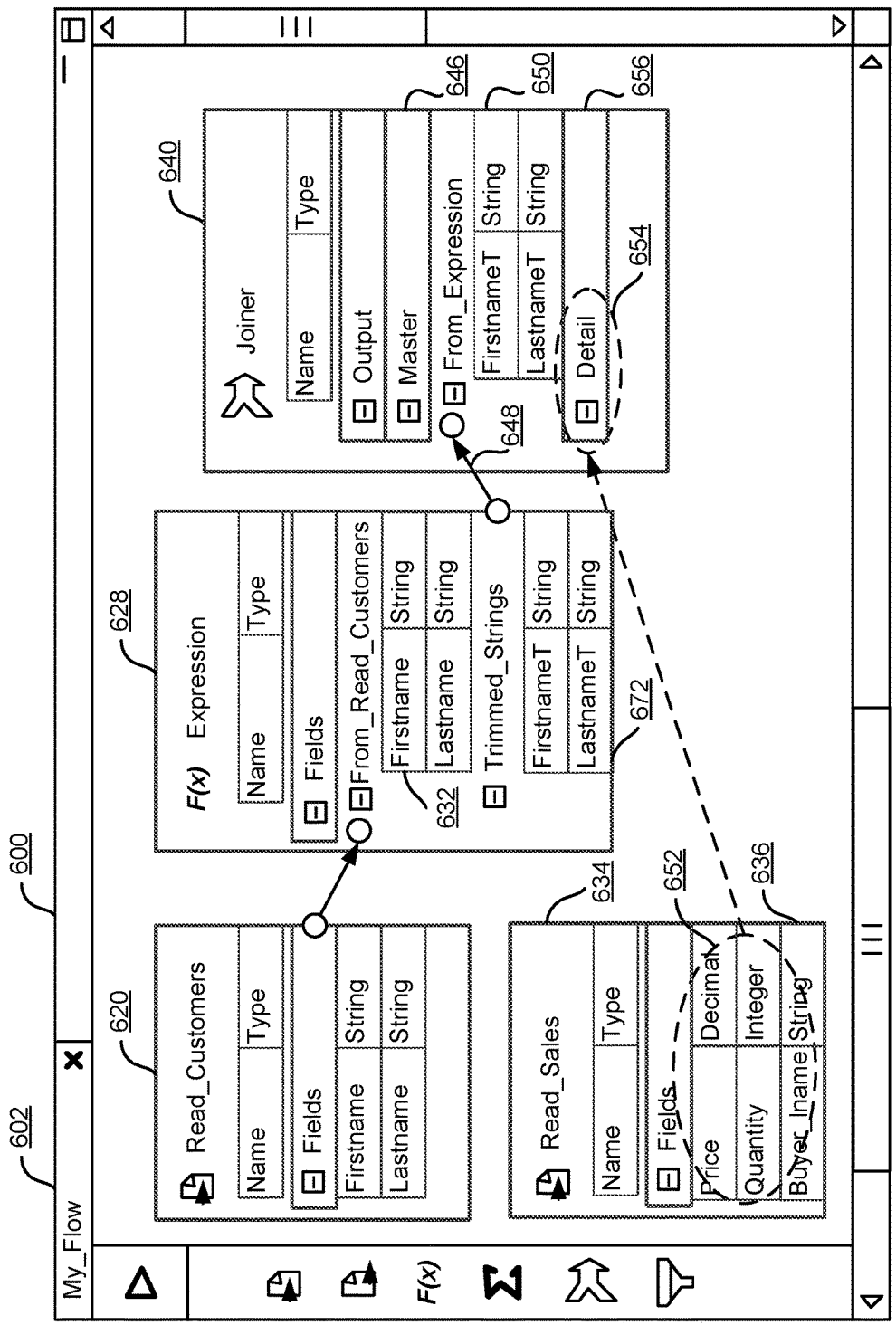
FIG. 6E also shows the data flow design environment user interface illustrating the drag and drop feature according to one embodiment.

FIG. 6E also shows the data flow user interface 600 illustrating the drag and drop feature according to one embodiment. Compared to the data flow 602 shown in FIG. 6D, the data flow shown in FIG. 6E includes an additional dynamic link 648, e.g., as result of the "drag and drop" action from the user shown in FIG. 6D. The dynamic link 648 maps the "Trimmed_Strings" dynamic port of upstream mapping fragment 628 to the input dynamic port "From_Expression" under the "Master" data field group 646. The "From_Expression" dynamic port includes two generated ports 650 each corresponding to a generated port of the "Trimmed_Strings" dynamic port.

The user interface module 210 receives input indicating yet another "drag and drop" action from the user via the client device 110. For instance, the user selects multiple data fields 652 corresponding to the static ports of mapping fragment 634 representing the "price," "quantity," and "Buyer_lname" data fields 636. The user "drags" the selection of the multiple data fields 652 to the mapping fragment 640 and "drops" the selection to the area 654 inside the mapping fragment 640 corresponding to the "Detail" data field group 656. Accordingly, the data flow module 220 generates static links between upstream mapping fragment 634 and downstream mapping fragment 640, which is further described below with reference to FIG. 6F.

Figure 6F:
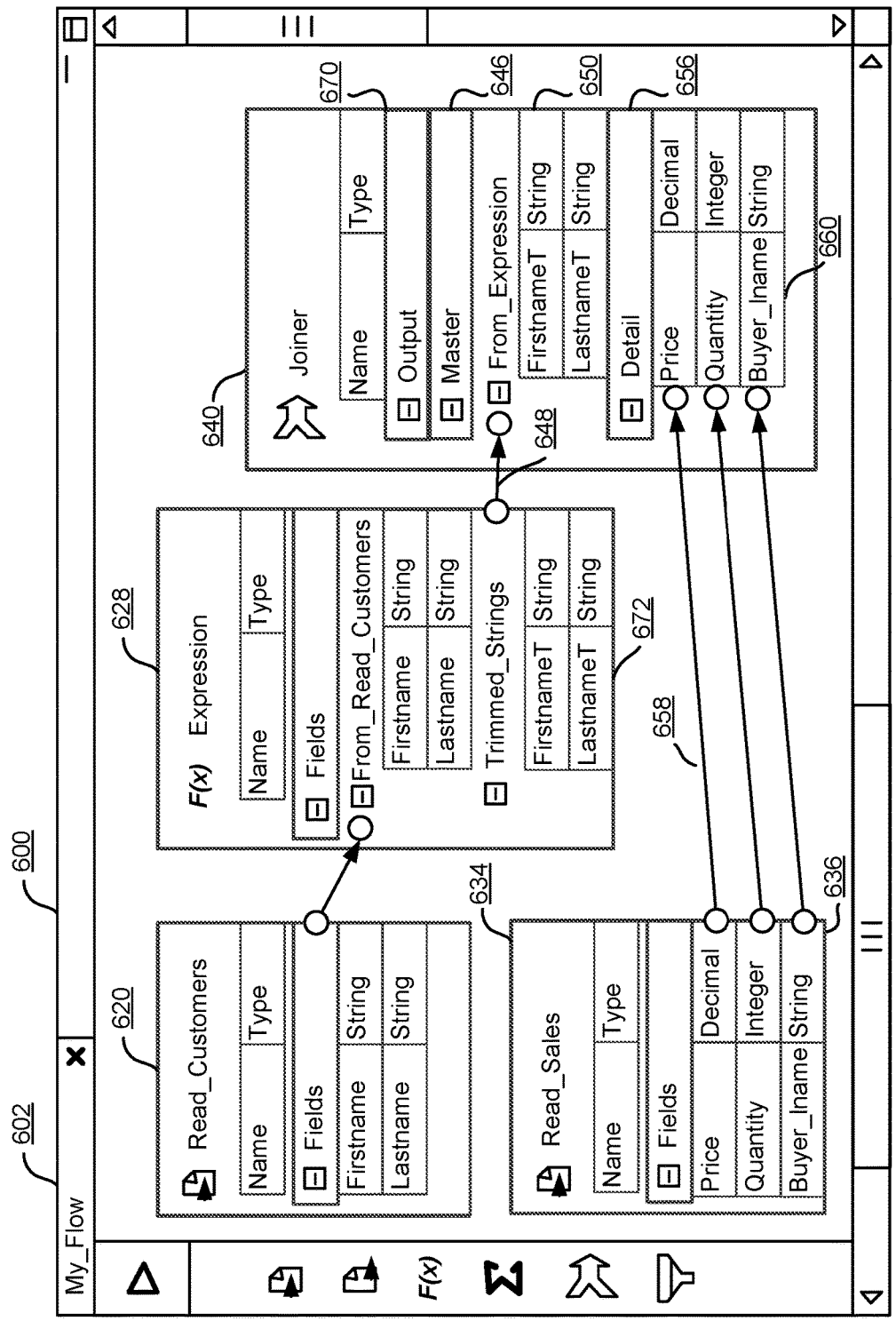
FIG. 6F shows the data flow design environment user interface illustrating static links according to one embodiment.

FIG. 6F shows the data flow user interface 600 illustrating static links according to one embodiment. Compared to the data flow 602 shown in FIG. 6D, the data flow shown in FIG. 6F includes additional static links 658, e.g., as result of the "drag and drop" action from the user shown in FIG. 6E. Each of the static links 658 map a static port of the data fields 636 of the upstream mapping fragment 634 to a static port of the data fields 660 under the "Detail" data field group 656 of the downstream mapping fragment 640. The data flow module 220 generates the static links 658 instead of a dynamic link because, e.g., the user selected multiple static ports, rather than a dynamic port or data field group, to drop in the downstream mapping fragment.

In some embodiments, the downstream mapping fragment of a "drag and drop" action does not allow the creation of new ports or does not support dynamic elements. In this case, when the user "drops" a selection of an area, the user interface 600 displays a dialog user interface that allows the user to design a runtime link for mapping an upstream mapping fragment to the downstream mapping fragment. The runtime link may be a combination of, for example, a configuration parameter representing a set of data fields whose values are supplied at runtime, a procedure based on data field names, or a database table lookup via the DBMS 150.

In some embodiments, the mapping fragment 640 joins a column of a table associated with the "lastname" data field and another column of a table associated with the "buyer_lname" (i.e., buyer lastname) data field because the mapping fragment 640 is a "joiner" type mapping fragment. These two data fields represent similar information, for example, a buyer's last name, and thus may be used for a match. Generally, a "joiner" type mapping fragment merges multiple tables (e.g., from source databases) into one table including a union of all columns of each merged table. In particular, the "joiner" type mapping fragment matches at least one column of each merged table. The matched columns are shown in an output data field group of the "joiner" type mapping fragment, for example, the "output" data field group 670 (e.g., shown in FIG. 6F in a collapsed view for purposes of clarity).

Figure 6G:
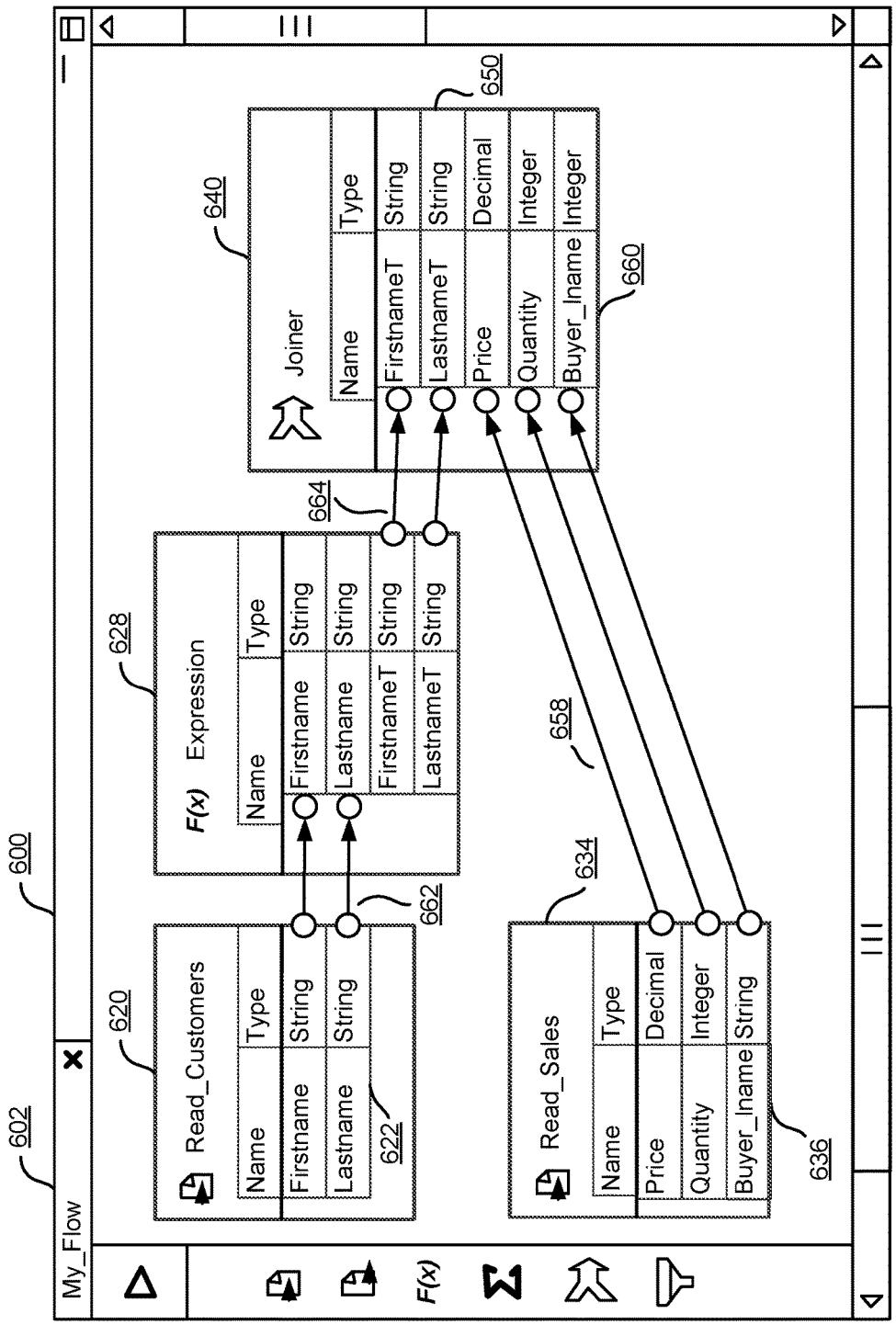
FIG. 6G shows a compiled executable runtime definition of the data flow shown in FIG. 6F according to one embodiment.

FIG. 6G shows a compiled executable runtime definition of the data flow 602 shown in FIG. 6F according to one embodiment. The compilation module 240 replaces the dynamic link 630 with a set of two static links 662 each mapping a static port of upstream mapping fragment 620 to a static port of downstream mapping fragment 628. Additionally, the compilation module 240 replaces the dynamic link 648 with a set of two static links 664 each mapping a static port of upstream mapping fragment 628 to a static port of downstream mapping fragment 640. The compilation module 240 removes dynamic ports and corresponding data field groups, e.g., dynamic ports "From_Read_Customers" and "Trimmed_Strings" are removed from mapping fragment 628. Further, the dynamic port "From_Expression" and data field groups "Output," "Master," and "Detail" are removed from the mapping fragment 640. The "Fields" data field groups from the other mapping fragments are removed as well. Note that the static links 658 are unchanged.

Figure 7:
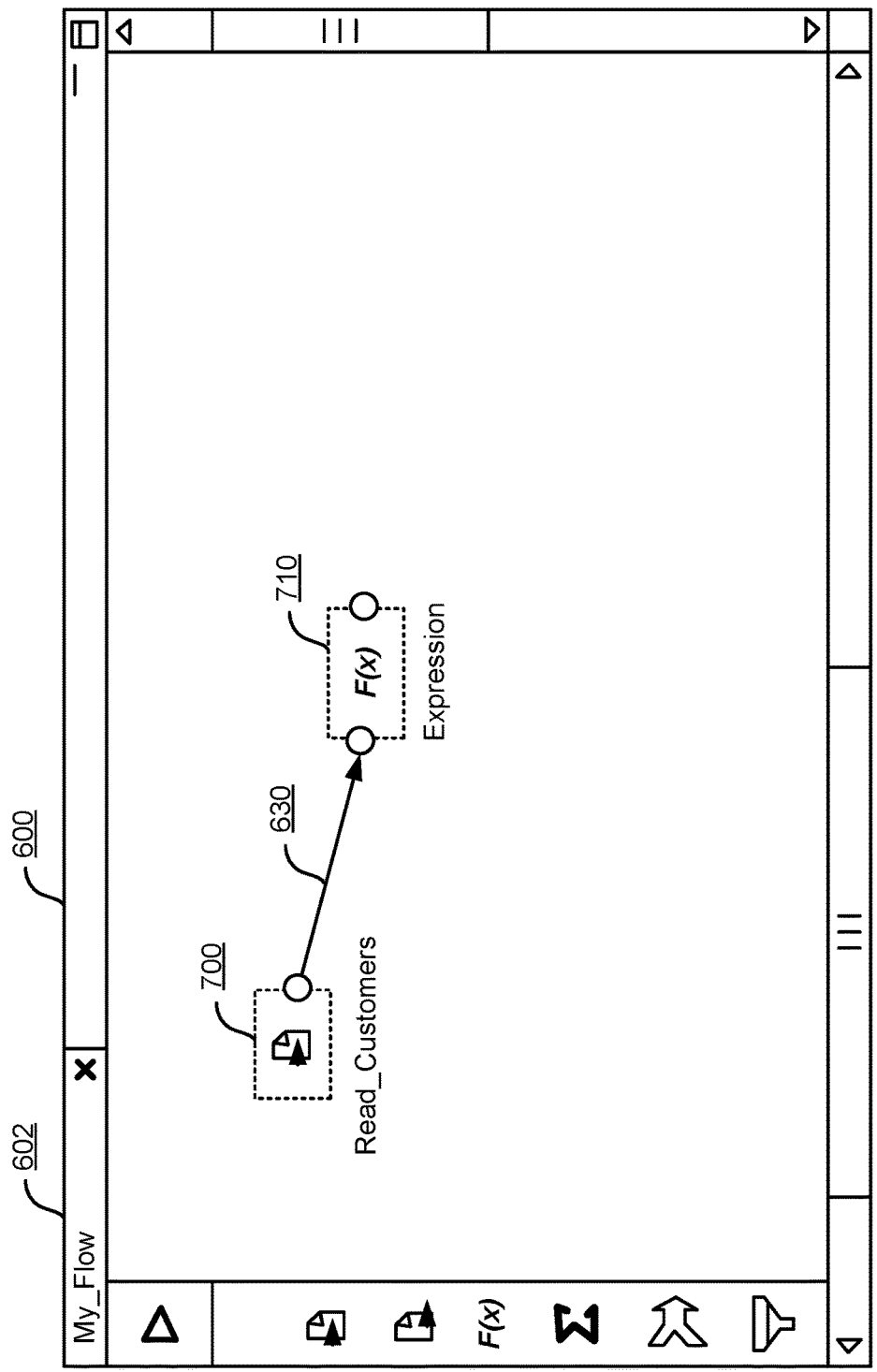
FIG. 7 shows linked icons in the data flow design environment user interface according to one embodiment.

FIG. 7 shows linked icons in the user interface 600 according to one embodiment. The user interface 600 includes an icon view of the data flow 602 shown in FIG. 6C. The icon view displays the icons for each mapping fragment of the data flow 602, but not the data fields of the mapping fragments. In particular, the mapping fragment 620 and the mapping fragment 628 are represented by the "read data" icon 700 and the "expression" icon 710, which are linked by the dynamic link 630. The icon view presents a condensed view of the data flow 602 to the user. For a data flow including a large number of mapping fragments and data fields, a condensed view provides a user friendly user interface 600 which is not cluttered by details of the data flow.

In one embodiment, the data flow design system 100 displays data flows in the icon view in the user interface 600 by default. Thus, mapping fragments added to the data flows are represented by the corresponding icons. The user interface 600 includes user preferences that allow a user to toggle between the icon view, i.e., as shown in FIG. 7, and the regular view, i.e., as shown in FIG. 6C.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable non-transitory medium containing computer program code, which can be executed by a computer processor for performing any or all of the steps, operations, or processes described.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method executed by one or more computing devices, the method comprising:
   receiving, in a data integration development environment executing on at least one of the one or more computing devices, a definition of a data flow modeling a data mapping, wherein receiving the definition of the data flow comprises:
      receiving a plurality of mapping fragments for inclusion in the data flow, wherein each mapping fragment comprises a plurality of ports, the plurality of ports including at least one dynamic port or one static port, a dynamic port corresponding to any number of ports of the plurality of ports, a static port corresponding to one port of the plurality of ports, each port corresponding to at least one data field;
      receiving input creating at least one dynamic link between a dynamic port of an upstream mapping fragment of the plurality of mapping fragments and a dynamic port of a downstream mapping fragment of the plurality of mapping fragments, the dynamic link providing all data fields of the dynamic port to the dynamic port; and
      receiving input creating at least one static link between a static port of an upstream mapping fragment of the plurality of mapping fragments and a static port of a downstream mapping fragment of the plurality of mapping fragments, the static link providing all data fields of the static port to the static port;
   receiving, by at least one of the one or more computing devices, one or more configuration parameters to apply to at least one mapping fragment of the plurality of mapping fragments, each configuration parameter including at least one configuration parameter value;
   applying, by at least one of the one or more computing devices, the one or more configuration parameters to the at least one mapping fragment by replacing each configuration parameter value of the one or more configuration parameters with a corresponding runtime value; and
   compiling, by at least one of the one or more computing devices, an executable runtime definition based at least in part on the definition of the data flow and the runtime values.

2. The method of claim 1, further comprising:
   executing, by at least one of the one or more computing devices, the executable runtime definition; and
   generating, by at least one of the one or more computing devices, a report based at least in part on the executing and input data from a database.

3. The method of claim 2, wherein receiving the definition of the data flow further comprises:
   receiving a runtime link between a reference upstream mapping fragment of the plurality of mapping fragments and a reference downstream mapping fragment of the plurality of mapping fragments;
   wherein executing the executable runtime definition comprises resolving the runtime link by providing all data fields of one or more ports of the reference upstream mapping fragment to one or more ports of the reference downstream mapping fragment.

4. The method of claim 2, wherein each mapping fragment of the plurality of mapping fragments corresponds to an input data source, output data source, or transformation.

5. The method of claim 4, further comprising:
   modifying, by at least one of the one or more computing devices, a mapping fragment of the plurality of mapping fragments corresponding to an input data source or an output data source;
   wherein executing the executable runtime definition does not require re-compiling the executable runtime definition.

6. The method of claim 1, wherein at least one configuration parameter of the one or more configuration parameters is a rule describing an exclusionary or inclusionary filter, and wherein applying the one or more configuration parameters to the at least one mapping fragment further comprises:
   replacing at least one configuration parameter value of the at least one configuration parameter with a corresponding runtime value based on a type of data field indicated by the exclusionary filter.

7. The method of claim 1, wherein at least one configuration parameter of the one or more configuration parameters is a proxy indicating a reference dynamic port of a mapping fragment of the plurality of mapping fragments, and wherein applying the one or more configuration parameters to the at least one mapping fragment further comprises:
   replacing at least one configuration parameter value of the at least one configuration parameter value with a corresponding runtime value based on the reference dynamic port.

8. The method of claim 1, wherein at least one configuration parameter of the one or more configuration parameters is a macro corresponding to a transformation, and wherein applying the one or more configuration parameters to the at least one mapping fragment further comprises:
   replacing at least one configuration parameter value of the at least one configuration parameter with a corresponding runtime value by applying the transformation over each port of the plurality of ports of the at least one mapping fragment.

9. The method of claim 1, wherein receiving the input creating the at least one dynamic link between the dynamic port of the upstream mapping fragment of the plurality of mapping fragments and the dynamic port of the downstream mapping fragment of the plurality of mapping fragments further comprises generating a plurality of generated ports, corresponding to all data fields of the dynamic port, for the dynamic port of the downstream mapping fragment.

10. At least one non-transitory computer-readable medium storing computer-readable instructions that, when executed by one or more computing devices, cause at least one of the one or more computing devices to:
receive, in a data integration development environment, a definition of a data flow modeling a data mapping, wherein the instructions that, when executed by at least one of the one or more computing devices, cause at least one of the one or more computing devices to receive the definition of the data flow further cause at least one of the one or more computing devices to:
receive a plurality of mapping fragments for inclusion in the data flow, wherein each mapping fragment comprises a plurality of ports, the plurality of ports including at least one dynamic port or one static port, a dynamic port corresponding to any number of ports of the plurality of ports, a static port corresponding to one port of the plurality of ports, each port corresponding to at least one data field;
receive input creating at least one dynamic link between a dynamic port of an upstream mapping fragment of the plurality of mapping fragments and a dynamic port of a downstream mapping fragment of the plurality of mapping fragments, the dynamic link providing all data fields of the dynamic port to the dynamic port; and
receive input creating at least one static link between a static port of an upstream mapping fragment of the plurality of mapping fragments and a static port of a downstream mapping fragment of the plurality of mapping fragments, the static link providing all data fields of the static port to the static port;
receive one or more configuration parameters to apply to at least one mapping fragment of the plurality of mapping fragments, each configuration parameter including at least one configuration parameter value;
apply the one or more configuration parameters to the at least one mapping fragment by replacing each configuration parameter value of the one or more configuration parameters with a corresponding runtime value; and
compile an executable runtime definition based at least in part on the definition of the data flow and the runtime values.

11. The at least one non-transitory computer-readable medium of claim 10, further storing computer-readable instructions that, when executed by at least one of the one or more computing devices, cause at least one of the one or more computing devices to:
execute the executable runtime definition.

12. The at least one non-transitory computer-readable medium of claim 11, wherein the instructions that, when executed by at least one of the one or more computing devices, cause at least one of the one or more computing devices to receive the definition of the data flow further cause at least one of the one or more computing devices to:
receive a runtime link between a reference upstream mapping fragment of the plurality of mapping fragments and a reference downstream mapping fragment of the plurality of mapping fragments;
wherein execute the executable runtime definition comprises resolving the runtime link by providing all data fields of one or more ports of the reference upstream mapping fragment to one or more ports of the reference downstream mapping fragment.

13. The at least one non-transitory computer-readable medium of claim 11, wherein each mapping fragment of the plurality of mapping fragments corresponds to an input data source, output data source, or transformation.

14. The at least one non-transitory computer-readable medium of claim 13, further storing computer-readable instructions that, when executed by at least one of the one or more computing devices, cause at least one of the one or more computing devices to:
modify a mapping fragment of the plurality of mapping fragments corresponding to an input data source or an output data source;
wherein execute the executable runtime definition does not require re-compiling the executable runtime definition.

15. The at least one non-transitory computer-readable medium of claim 10, wherein at least one configuration parameter of the one or more configuration parameters is a rule describing an exclusionary or inclusionary filter, and wherein the instructions that, when executed by at least one of the one or more computing devices, cause at least one of the one or more computing devices to apply the one or more configuration parameters to the at least one mapping fragment further cause at least one of the one or more computing devices to:
replace at least one configuration parameter value of the at least one configuration parameter with a corresponding runtime value based on a type of data field indicated by the exclusionary filter.

16. The at least one non-transitory computer-readable medium of claim 10, wherein at least one configuration parameter of the one or more configuration parameters is a proxy indicating a reference dynamic port of a mapping fragment of the plurality of mapping fragments, and wherein the instructions that, when executed by at least one of the one or more computing devices, cause at least one of the one or more computing devices to apply the one or more configuration parameters to the at least one mapping fragment further cause at least one of the one or more computing devices to:
replace at least one configuration parameter value of the at least one configuration parameter with a corresponding runtime value based on the reference dynamic port.

17. The at least one non-transitory computer-readable medium of claim 10, wherein at least one configuration parameter of the one or more configuration parameters is a macro corresponding to a transformation, and wherein the instructions that, when executed by at least one of the one or more computing devices, cause at least one of the one or more computing devices to apply the one or more configuration parameters to the at least one mapping fragment further cause at least one of the one or more computing devices to:
replace at least one configuration parameter value of the at least one configuration parameter with a corresponding runtime value by applying the transformation over each port of the plurality of ports of the at least one mapping fragment.

18. The at least one non-transitory computer-readable medium of claim 10, wherein the instructions that, when executed by at least one of the one or more computing devices, cause at least one of the one or more computing devices to receive the input creating the at least one dynamic link between the dynamic port of the upstream mapping fragment of the plurality of mapping fragments and the dynamic port of the downstream mapping fragment of the plurality of mapping fragments further cause at least one of the one or more computing devices to:

generate a plurality of generated ports, corresponding to all data fields of the dynamic port, for the dynamic port of the downstream mapping fragment.

19. An apparatus comprising:

one or more processors; and one or more memories operatively coupled to at least one of the one or more processors and having instructions stored thereon that, when executed by at least one of the one or more processors, cause at least one of the one or more processors to:

receive, in a data integration development environment, a definition of a data flow modeling a data mapping, wherein the instructions that, when executed by at least one of the one or more processors, cause at least one of the one or more processors to receive the definition of the data flow further cause at least one of the one or more processors to:

receive a plurality of mapping fragments for inclusion in the data flow, wherein each mapping fragment comprises a plurality of ports, the plurality of ports including at least one dynamic port or one static port, a dynamic port corresponding to any number of ports of the plurality of ports, a static port corresponding to one port of the plurality of ports, each port corresponding to at least one data field;

receive input creating at least one dynamic link between a dynamic port of an upstream mapping fragment of the plurality of mapping fragments and a dynamic port of a downstream mapping fragment of the plurality of mapping fragments, the dynamic link providing all data fields of the dynamic port to the dynamic port; and receive input creating at least one static link between a static port of an upstream mapping fragment of the plurality of mapping fragments and a static port of a downstream mapping fragment of the plurality of mapping fragments, the static link providing all data fields of the static port to the static port;

receive one or more configuration parameters to apply to at least one mapping fragment of the plurality of mapping fragments, each configuration parameter including at least one configuration parameter value;

apply the one or more configuration parameters to the at least one mapping fragment by replacing each configuration parameter value of the one or more configuration parameters with a corresponding runtime value; and compile an executable runtime definition based at least in part on the definition of the data flow and the runtime values.

20. The apparatus of claim 19, wherein at least one configuration parameter of the one or more configuration parameters is one or more of a rule describing an exclusionary or inclusionary filter, a proxy indicating a reference dynamic port of a mapping fragment of the plurality of mapping fragments, or a macro corresponding to a transformation.

21. The apparatus of claim 19, wherein the instructions that, when executed by at least one of the one or more processors, cause at least one of the one or processors to receive the input creating the at least one dynamic link between the dynamic port of the upstream mapping fragment of the plurality of mapping fragment and the dynamic port of the downstream mapping fragment of the plurality of mapping fragment further cause at least one of the one or more processors to:

replace at least one configuration parameter value of the at least one configuration parameter with a corresponding runtime value based on one of: a type of data field indicated by the exclusionary filter, the reference dynamic port, or applying the transformation over each port of the plurality of ports of the at least one mapping fragment.

* * * * *